United States Patent [19]
Nishiyama

[11] Patent Number: 5,644,684
[45] Date of Patent: Jul. 1, 1997

[54] HIGH-EFFICIENCY COMPRESSION SUITABLE FOR USE IN CHARACTER GENERATION

[75] Inventor: Masaki Nishiyama, Yokohama, Japan

[73] Assignee: Canon Kabushiki Kaisha, Tokyo, Japan

[21] Appl. No.: 209,888

[22] Filed: Mar. 14, 1994

[30] Foreign Application Priority Data

| Mar. 15, 1993 | [JP] | Japan | 5-053895 |
| Mar. 15, 1993 | [JP] | Japan | 5-053896 |
| Jul. 27, 1993 | [JP] | Japan | 5-185111 |

[51] Int. Cl.$^6$ ................................................ G06K 9/36
[52] U.S. Cl. ................................................ 395/110
[58] Field of Search .................................. 395/110, 114, 395/115, 116, 111, 112, 1.1

[56] References Cited

U.S. PATENT DOCUMENTS

| 5,157,482 | 10/1992 | Cosgrove | 358/54 |
| 5,182,652 | 1/1993 | Stephenson, III | 358/296 |
| 5,270,728 | 12/1993 | Lund et al. | 346/1.1 |
| 5,270,836 | 12/1993 | Kang | 358/459 |
| 5,293,259 | 3/1994 | Eschbach | 358/445 |
| 5,303,334 | 4/1994 | Snyder et al. | 395/109 |
| 5,387,985 | 2/1995 | Log et al. | 358/447 |
| 5,414,811 | 5/1995 | Parolski et al. | 395/162 |
| 5,469,198 | 11/1995 | Kadonaga | 347/41 |

*Primary Examiner*—Raymond J. Bayerl
*Assistant Examiner*—Steven P. Sax
*Attorney, Agent, or Firm*—Fitzpatrick, Cella, Harper & Scinto

[57] ABSTRACT

There is disclosed an output apparatus comprising a storage having a submatrix obtained by means of dividing a character set where one character being formed of bit patterns of M rows by N columns into M1 rows by N1 columns for each character, an indexing submatrix group where different patterns in said submatrix are indexed and aligned, and an indexing number storing area for storing numbers used for looking up the indexing submatrix; and a control unit for making the indexing number storing area have a variable length.

21 Claims, 36 Drawing Sheets

FIG. 11

```
PITCH TABLE (=20000h):                                                                          ;COMMON CHARACTER (00-7F)
     ;  x0,  x1,  x2,  x3,  x4,  x5,  x6,  x7,  x8,  x9,  xA,  xB,  xC,  xD,  xE,  xF
  DB   0,  24,  42,  18,  30,  30,  36,   0,   0,   0,   0,   0,   0,   0,   0,   0    ; 0x
  DB   0,   0,   0,   0,   0,  30,   0,   0,   0,   0,   0,   0,   0,   0,   0,   0    ; 1x
  DB  30,  18,  30,  30,  30,  36,  36,  18,  24,  24,  30,  30,  18,  30,  18,  30    ; 2x
  DB  30,  30,  30,  30,  36,  36,  30,  36,  30,  30,  18,  36,  30,  30,  30,  30    ; 3x
  DB  36,  36,  36,  36,  36,  36,  36,  42,  36,  36,  30,  36,  36,  42,  36,  36    ; 4x
  DB  36,  36,  24,  42,  36,  42,  24,  36,  18,  36,  24,  24,  18,  24,  30,  30    ; 5x
  DB  18,  30,  30,  30,  30,  30,  24,  36,  36,  18,  30,  36,  18,  42,  30,  30    ; 6x
  DB  36,  36,  30,  30,  24,  36,  36,  42,  30,  36,  30,  24,  18,  24,  30,   0    ; 7x
```

FIG. 16
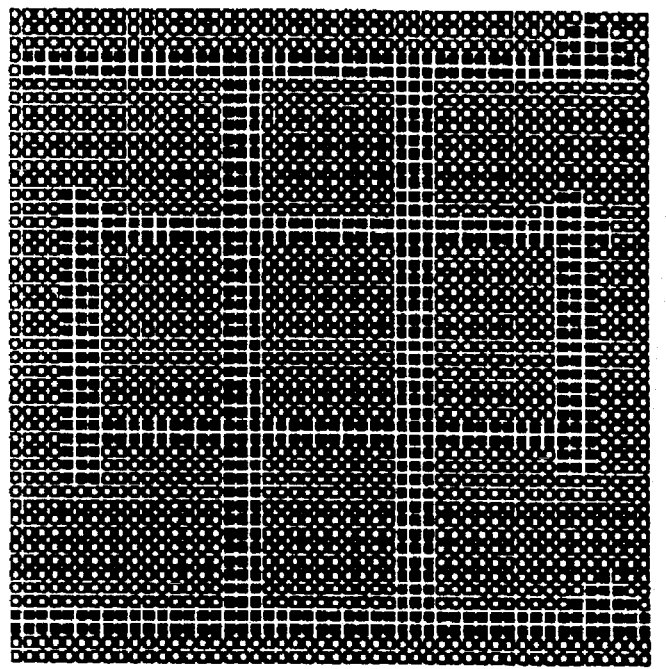
NO. OF DATA = 288(6*48) BYTES
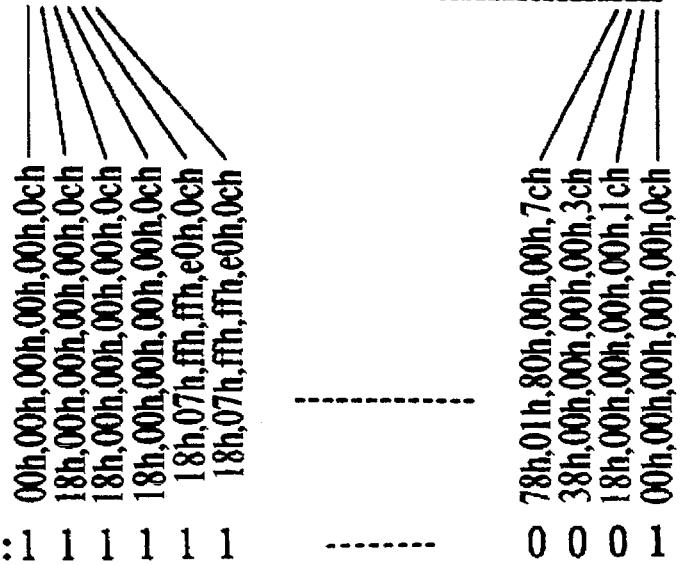
INDEXING
INDICATOR: 1 1 1 1 1 1      --------      0 0 0 1

NO. OF DATA = 288(6*48) BYTES

ATTRIBUTE INDICATOR: 01,01,11,11,11,11

00h,00h,00h,00h,00h,0ch
18h,00h,00h,00h,00h,0ch
18h,00h,00h,00h,00h,0ch
18h,00h,00h,00h,00h,0ch
18h,07h,ffh,ffh,e0h,0ch
18h,07h,ffh,ffh,e0h,0ch 78h,01h,80h,00h,00h,7ch
38h,00h,00h,00h,00h,3ch
18h,00h,00h,00h,00h,1ch
00h,00h,00h,00h,00h,0ch 10,10,10,01

FIG. 24
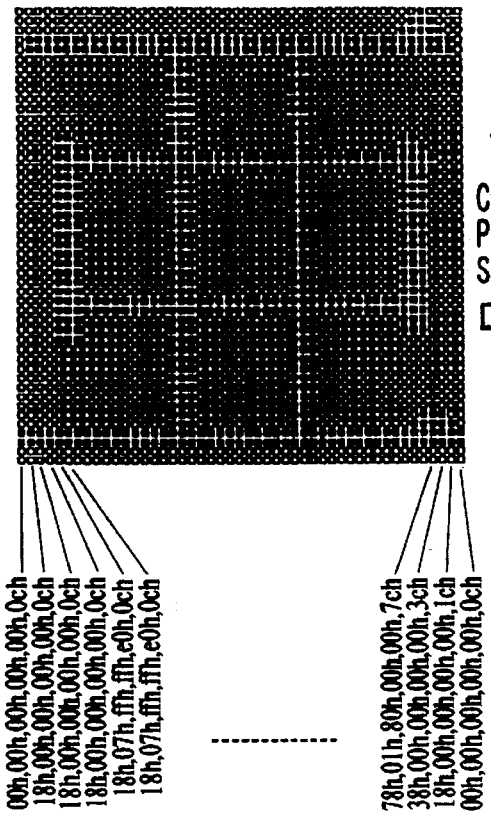
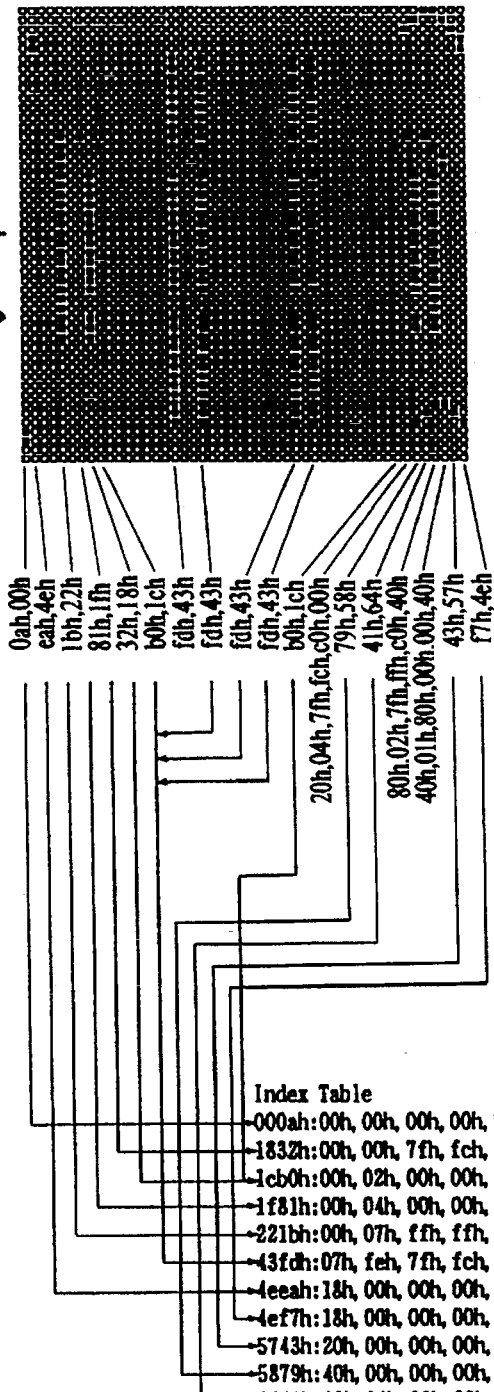

BLANK CHR TABLE: 0322h
2121h, 222fh, 2230h, 2231h, 2232h, 2233h, ----- 4f7dh, 4f7eh

FIG. 35

```
    JIS Kanji Code
21--
      0123456789ABCDEF           #      * 2120 AND 217F NOT DEFINED
20    ⏌ 、。,．・：；？！ ゛ ゜       #
30    ´｀¨＾￣＿ヽヾゝゞ〃仝々〆〇ー―‐／   #
40    ＼～∥｜…‥''""()〔〕[]            #
50    {}〈〉《》「」『』【】＋－±×          #
60    ÷＝≠＜＞≦≧∞∴♂♀°′″℃￥        #
70    ＄¢£％＃＆＊＠§☆★○●◎◇⌐        #

22--
      0123456789ABCDEF           #      * 2×20 AND 2×7F NOT DEFINED
20    ⏌◆□■△▲▽▼※〒→←↑↓＝          #
30                 ∈∋⊆⊇⊂⊃          #
40    ∪∩              ∧∨￢⇒⇔∀    #
50    ∃              ∠⊥⌒∂           #
60    ∇≡≒≪≫√∽∝∵∫∬                #
70     Å‰♯♭♪†‡¶       ○⌐          #

23--
      0123456789ABCDEF           #
20    ⏌                          #
30     0123456789                #
40      ABCDEFGHIJKLMNO          #
50     PQRSTUVWXYZ               #
60      abcdefghijklmno          #
70     pqrstuvwxyz       ⌐       #

24--
      0123456789ABCDEF           #
20    ⏌ぁあぃいぅうぇえぉおかがきぎく   #
30    ぐけげこごさざしじすずせぜそぞた   #
40    だちぢっつづてでとどなにぬねのは   #
50    ばぱひびぴふぶぷへべぺほぼぽまみ   #
60    むめもゃやゅゆょよらりるれろゎわ   #
70    ゐゑをん            ⌐        #

25--
      0123456789ABCDEF           #
20    ⏌ァアィイゥウェエォオカガキギク   #
30    グケゲコゴサザシジスズセゼソゾタ   #
40    ダチヂッツヅテデトドナニヌネノハ   #
50    バパヒビピフブプヘベペホボポマミ   #
60    ムメモャヤュユョヨラリルレロヮワ   #
70    ヰエヲンヴヵヶ         ⌐       #

26--
      0123456789ABCDEF           #
20    ⏌ΑΒΓΔΕΖΗΘΙΚΛΜΝΞΟ           #
30    ΠΡΣΤΥΦΧΨΩ                  #
40     αβγδεζηθικλμνξο           #
50    πρστυφχψω                  #
60                               #
70                    ⌐          #
```

```
2D--
    0 1 2 3 4 5 6 7 8 9 A B C D E F        #
20  ┘①②③④⑤⑥⑦⑧⑨⑩⑪⑫⑬⑭⑮           #
30  ⑯⑰⑱⑲⑳ I II III IV V VI VII VIII IX X    #
40  ㍉㌔㌢㍍㌘㌧㌃㌶㍑㍗㌍㌦㌣㌫㍊㌻           #
50  ㎜㎝㎞㎎㎏㏄㎡・                  ㍽  #
60  ¨. №KKTel㊤㊥㊦㊧㊨㈱㈲㈹㍾㍻㍼          #
70  ≒≡∫♯Σ√⊥∠∟⊿∵∩∪      ┌         #

2E--
    0 1 2 3 4 5 6 7 8 9 A B C D E F        #
20  ┘                                      #
30                                          #
40                                          #
50                                          #
60                                          #
70                                  ┌      #
ESC/P Kanji Code 2F--
    0 1 2 3 4 5 6 7 8 9 A B C D E F        #
20  ┘                                      #
30                                          #
40                                          #
50                                          #
60                                          #
70                                  ┌      #

30--
    0 1 2 3 4 5 6 7 8 9 A B C D E F        #
20  ┘亜唖娃阿哀愛挨姶逢葵茜穐悪握渥           #
30  旭葦芦鯵梓圧斡扱宛姐虻飴絢綾鮎或           #
40  粟袷安庵按暗案闇鞍杏以伊位依偉囲           #
50  夷委威尉惟意慰易椅為畏異移維緯胃           #
60  萎衣謂違遺医井亥域育郁磯一壱溢逸           #
70  稲茨芋鰯允印咽員因姻引飲淫胤蔭┌         #

31--
    0 1 2 3 4 5 6 7 8 9 A B C D E F        #
20  ┘院陰隠韻吋右宇烏羽迂雨卯鵜窺丑           #
30  碓臼渦嘘唄欝蔚鰻姥厩浦瓜閏噂云運           #
40  雲荏餌叡営嬰影映曳栄永泳洩瑛盈穎           #
50  頴英衛詠鋭液疫益駅悦謁越閲榎厭円           #
60  園堰奄宴延怨掩援沿演炎焔煙燕猿縁           #
70  艶苑薗遠鉛鴛塩於汚甥凹央奥往応┌         #

32--
    0 1 2 3 4 5 6 7 8 9 A B C D E F        #
20  ┘押旺横欧殴王翁襖鴬鴎黄岡沖荻億           #
30  屋憶臆桶牡乙俺卸恩温穏音下化仮何           #
40  伽価佳加可嘉夏嫁家寡科暇果架歌河           #
50  火珂禍禾稼箇花苛茄荷華菓蝦課嘩貨           #
60  迦過霞蚊俄峨我牙画臥芽蛾賀雅餓駕           #
70  介会解回塊壊廻快怪悔恢懐戒拐改┌         #

33--
    0 1 2 3 4 5 6 7 8 9 A B C D E F        #
```

HIGH-EFFICIENCY COMPRESSION SUITABLE FOR USE IN CHARACTER GENERATION

BACKGROUND OF THE INVENTION

1. Field of the Invention

This invention relates to an output apparatus such as a printing machine and a display device that are capable of producing after performing compression and extension effectively on character patterns, and to a method of processing outputs.

2. Related Background Art

Conventionally in a so-called dictionary (indexing) based compression method, a set of characters where one character is formed of bit patterns of M rows by N columns is divided for each character into a submatrix of M1 rows by N1 columns and performing indexing (assigning a same number to submatrices having the same dot patterns) on all of said submatrices to represent the character divided into said M1 rows by N1 columns by an index number associated with each submatrix, thereby M1 by N1 bits of the submatrix is compressed into bit numbers (generally a multiple of 8) used in the index number.

As the actual compressed data, a dot pattern tables (dictionaries) are required that are arranged in the indexing order along with the compressed data represented by the index numbers.

In addition, in the character pattern output apparatus of the type described that is known conventionally, a character font pattern comprising no print dot as the font data, i.e., a blank font is stored in the same manner as for the normal character fonts.

However, the above mentioned related art has the following disadvantages.

More specifically, in the related art, the indexing is performed for compression on the submatrix that is appeared only once in all submatrices, so that more storage is required than the original data by the number of bits (index bits) used in the index number to such submatrix (because the size of the M1 by N1 bits submatrix stored in the dot pattern table is constant regardless of the time of references).

In addition, one numeral is assigned to the submatrix that is referred only once, so that the increased number of numerals are required for indexing, increasing the index bits. Accordingly, there is a defect that the compression efficiency is extremely bad for compression of patterns containing many matrices of this type.

Further, there is a disadvantage of waste because the actual submatrix pattern should be referred from the index number even for the submatrix that is referred only once during extension, as for the submatrix referred two or more times.

Moreover, in the conventional art, an index number storing region is fixed length, so that the compression efficiency is extremely bad because the number of bits used in the index number is increased for those having many patterns such as kanji fonts.

On the other hand, as for a proportional font used in the alphanumeric fonts, a font box is adapted to those having the largest character width, so that a space is developed in the conventional art for those containing a small character.

In addition, according to a method of storage in the conventional art, the kanji fonts defined by JIS contain many space or blank fonts where no print dot is contained, so that such space fonts results in the increased storage region, with many wastes, in printers or CRTs in recent years where highly accurate fine production is required.

SUMMARY OF THE INVENTION

Accordingly, the present invention is directed to provide an output apparatus and a method of processing outputs, permitting a solution of the above mentioned problems and an object thereof is to store waste-free font patterns effectively in a memory as well as to read out of the memory and produce the font patterns effectively.

Under such object, a preferred aspect of the present invention discloses an output apparatus comprising an indexing submatrix group in which those appeared N times or more (N≧2) in all submatrices are subjected to indexing and listed in the other of indexes, and an index indicator for use in discriminating M1 by N1 dot pattern submatrices from indexing submatrices, and a method of processing outputs.

In addition, it is disclosed an output apparatus and a method of processing outputs in which a storage for a numeral referring the indexing submatrices is variable length.

Further, it is disclosed an output apparatus and a method of processing outputs in which such a character width is provided that is used in a proportional font, and an extension processing is interrupted at the time when extension for the character width is completed.

Moreover, it is disclosed an output apparatus and a method of processing outputs in which a blank character discriminating means is provided that discriminate a blank font that contains no print dot from a character set in which one character is formed of bit patterns of M rows by N columns, thereby allowing deletion of data associated with the blank font.

In addition, it is preferable that a developing means is provided for developing compressed data obtained by means of compressing the character set of characters each being formed of bit patterns of said M rows by N columns, the developing means producing a blank character in response to an output of said blank character discriminating means.

Further, it may be so structured that a number storing area that forms a submatrix by means of dividing each character formed of the bit patterns of said M rows by N columns into M1 rows by N1 columns, thereby storing, for each character, a numeral of the indexing submatrix indexed for every pattern having a different submatrix.

These and other objects and features of the present invention will become more fully apparent from the following description and appended claims taken in conjunction with the accompanying drawings.

According to the above mentioned structure, a high compression rate can be achieved for any font patterns. In addition, an index number can be made to have a variable length, allowing a font compression at a high flexibility and compression rate.

Further, it is possible to eliminate a waste submatrix in a larger portion than the character width, which makes it possible to achieve compression at a high compression rate. It also allows extension at a high speed.

Furthermore, it becomes unnecessary to store a large amount of blank character data, permitting elimination of waste data for a blank character portions and compression at a high compression rate.

BRIEF DESCRIPTION OF THE DRAWINGS

FIG. 11 is a view showing a pitch table according to the fourth embodiment;

FIG. 16 is a view showing a bit arrangement and an index indicator for a character "田";

FIG. 24 is a view showing an XOR processing and an attribute indicator according to an eleventh embodiment;

FIG. 35 is a view showing JIS character codes;

FIG. 36 is a view showing JIS character codes; and

FIG. 37 is a view showing JIS character codes.

DESCRIPTION OF THE PREFERRED EMBODIMENTS

First Embodiment

Figure 1:
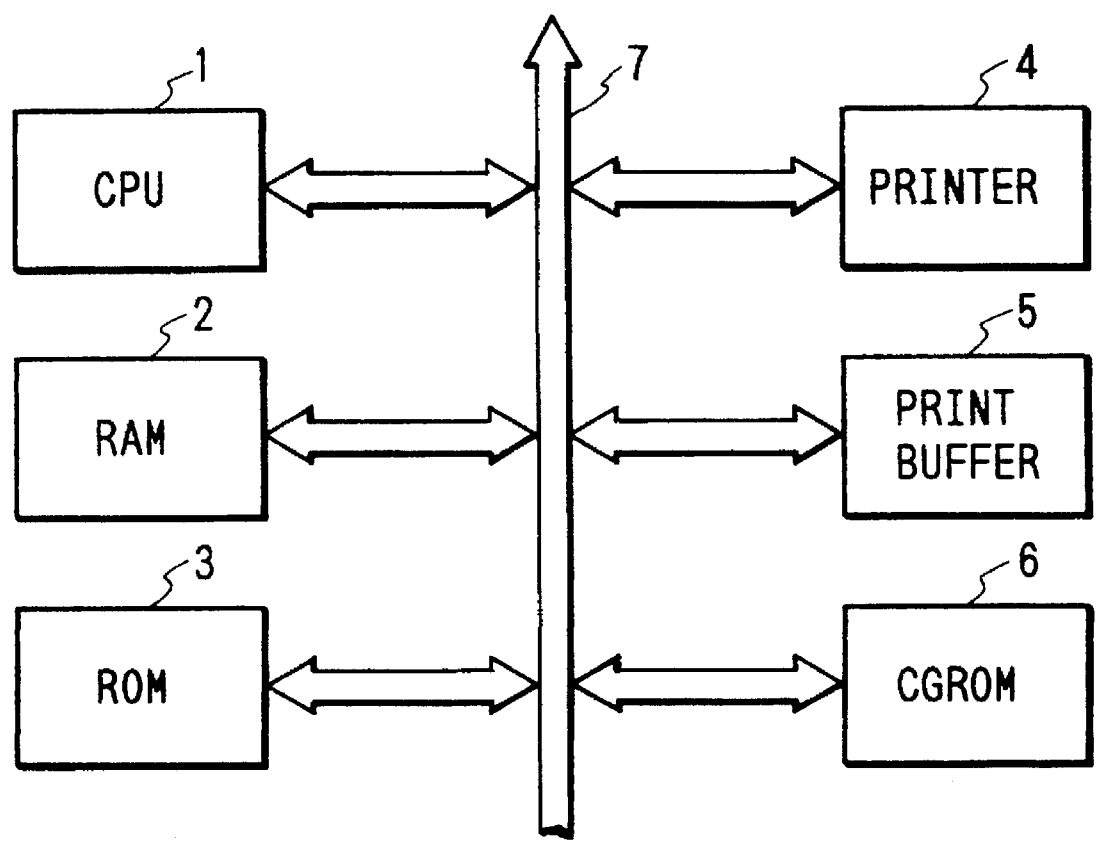
FIG. 1 is a structural diagram of a present embodiment.

Referring to the drawings, the present invention is described in detail below. FIG. 1 is a structural diagram of a first embodiment. In the figure, a reference numeral 1 represents a central processing unit (CPU) which governs various kinds of processing and which reads procedures out of a read-only memory (ROM) storing control procedures shown in FIG. 4 to execute them. A reference numeral 2 represents a random-access memory (RAM) comprising areas FADDR, INDFLG, SCOUNTER, INO and IADDR. A reference numeral 3 represents a read-only memory (ROM) for storing the procedures shown in FIG. 4. A reference numeral 4 represents a printer while a reference numeral 5 represents a print buffer for use in latching print data to the printer 4. A reference numeral 6 represents a character generator read-only memory (CGROM) which stores compressed fonts and index indicators according to the present invention. Finally, a reference numeral 7 represents a common bus (SB) for transmitting and receiving data between the CPU and other peripheral devices.

Figure 2:
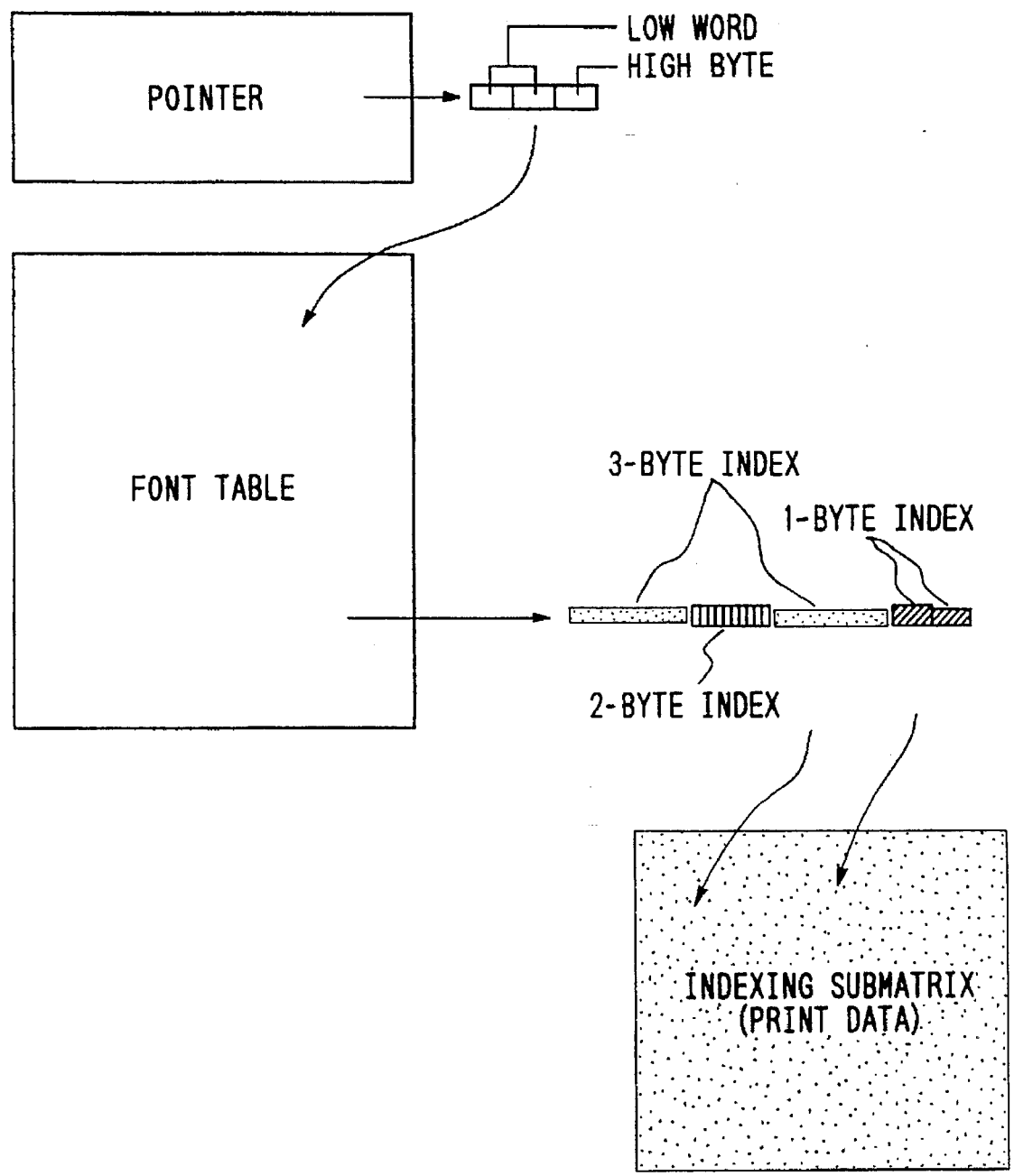
FIG. 2 is a structural diagram of a CGROM according to a first embodiment.

Next, structure in the CGROM 6 according to this embodiment is described with reference to FIG. 2. The CGROM comprises a pointer unit for storing addresses of a fixed length (.three bytes in this embodiment) for characters, a font table unit including indexes (index numbers) looked up according to a pointer, and finally an indexing submatrix looked up according to the index numbers.

Figure 3:
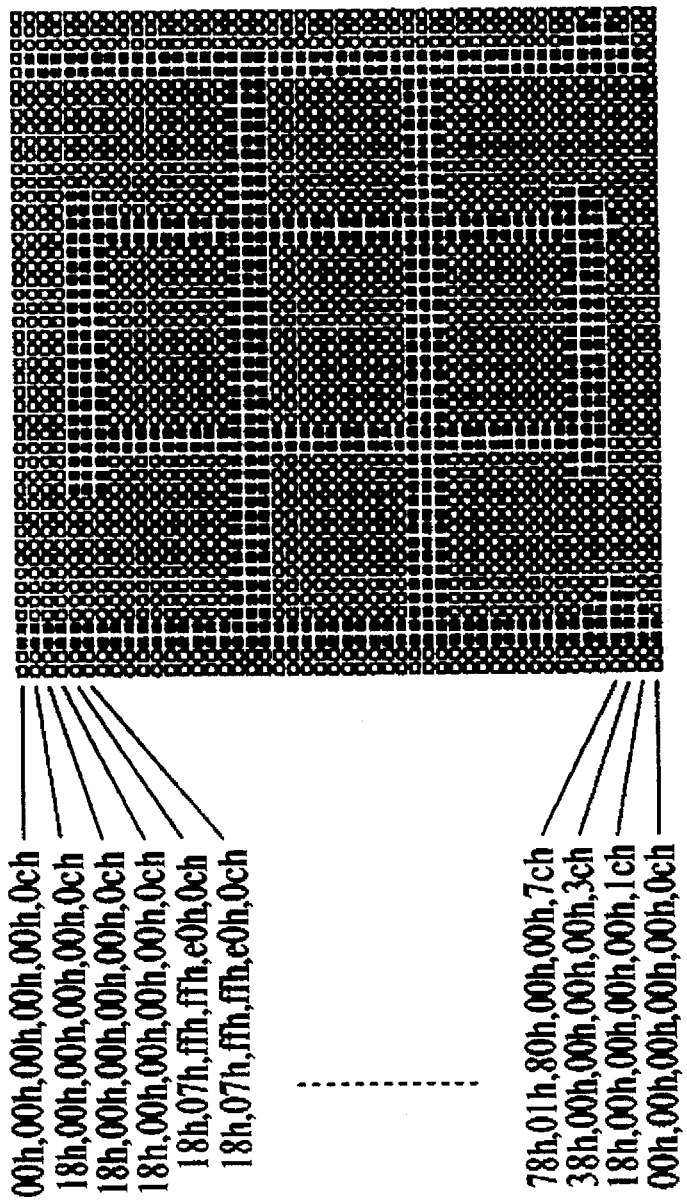
FIG. 3 is a view showing a bit arrangement and an index indicator for a character "田"

In addition, for a font as shown in FIG. 3, logic "1" and logic "0" are assigned to dots consisting of 48 by 48 bit patterns and to be printed and blank dots, respectively. Further, in this embodiment, an original image is divided into submatrices of 48 dots in length by 1 dot in width (hereinafter, referred to as "slices") for compression. However, applications of the present embodiment are not limited to it. Instead, it can be readily understood by those skilled in the art that equivalent processing can be made for font patterns of any sizes or submatrices of any sizes.

In the following description, numerals with a least significant figure to which "h" is added represent hexadecimal numbers while which "b" is added represent binary numbers. Nothing is added to decimal numbers.

In this embodiment, index numbers of 1 byte, 2 bytes and 3 bytes are assigned to those of approximately 160 thousand divergent patterns for 8120 mincho characters in the order from the most frequent appearance. More specifically, one-byte numbers 00h through 7fh are assigned to 128 patterns that are appeared at the highest frequency. Two-byte numbers 8000h through efffh are assigned to 28672 patterns that are appeared at the second highest frequency and three-byte numbers f00000 through f1ffffh are assigned to the remaining patterns. However, applications of the present invention are not limited to it and other assignment can be used.

In the present embodiment, the index number has a fixed length depending on frequency of its appearance.

Figure 4:
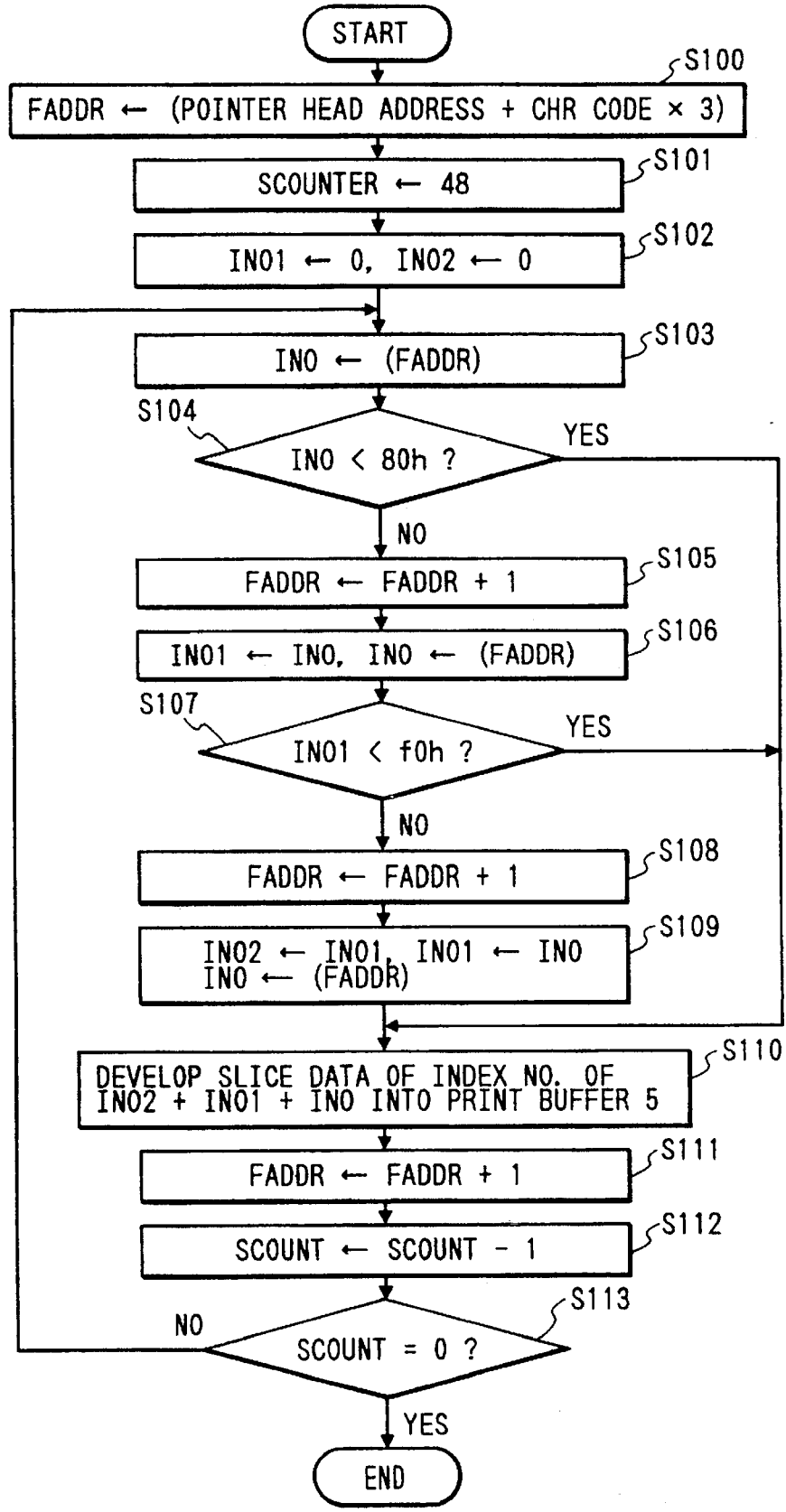
FIG. 4 is a flow chart of a control according to the first embodiment.

With the above mentioned structure, an entire control of the CPU 1 shown in FIG. 4 that is contained in the ROM 3 is described first.

First, at step S100, the CPU 1 calculates a character code×3+a pointer head address of a font to be produced. An address of a real font data of three bytes stored in that address is stored in the FADDR. (Those in parentheses in the flow chart represent stored contents.) Subsequently, at step S101, 48 is substituted as an initial value of the SCOUNTER to process by 48 slices. In addition, at step S102, 0 is substituted to an INO1 and an INO2. Next, at step S103, contents of the address indicated by the FADDR are copied by one byte to the INO. Subsequently, at step S104, it is determined whether the INO is larger than 80h. If the decision indicates "true", step S111 is carried out. If the decision indicates "false", step S105 is carried out to increment the value of the FADDR by one. Next, at step S106, the value of the INO is copied to the INO1 and the contents of the address indicated by the FADDR are copied to the INO by one byte. At step S104, it is determined whether the INO is larger than f0h. If the decision indicates "true", the step S111 is carried out. If the decision indicates "false", the value of the FADDR is incremented by one at step S108. Next, at step S109, the value of the INO 1 and the value of the INO are copied to the INO2 and INO1, respectively. Further, the contents of the address indicated by the FADDR are copied to the INO by one byte.

Subsequently, at the step S111, the INO2, the INO1 and the INO are developed into the print buffer 5 in this order as the index numbers of three byte with the slice data registered previously in these numbers used as the print data. Next, at the step S111, the value of the FADDR is incremented by one. Next, at step S112, a value of the SCOUNT is decremented by one. Finally, at step S113, it is determined whether the SCOUNT becomes "0". If the decision is false, the step S103 is again executed while the processing is stopped when the decision is true.

Next, description is made with an example.

Figure 5:
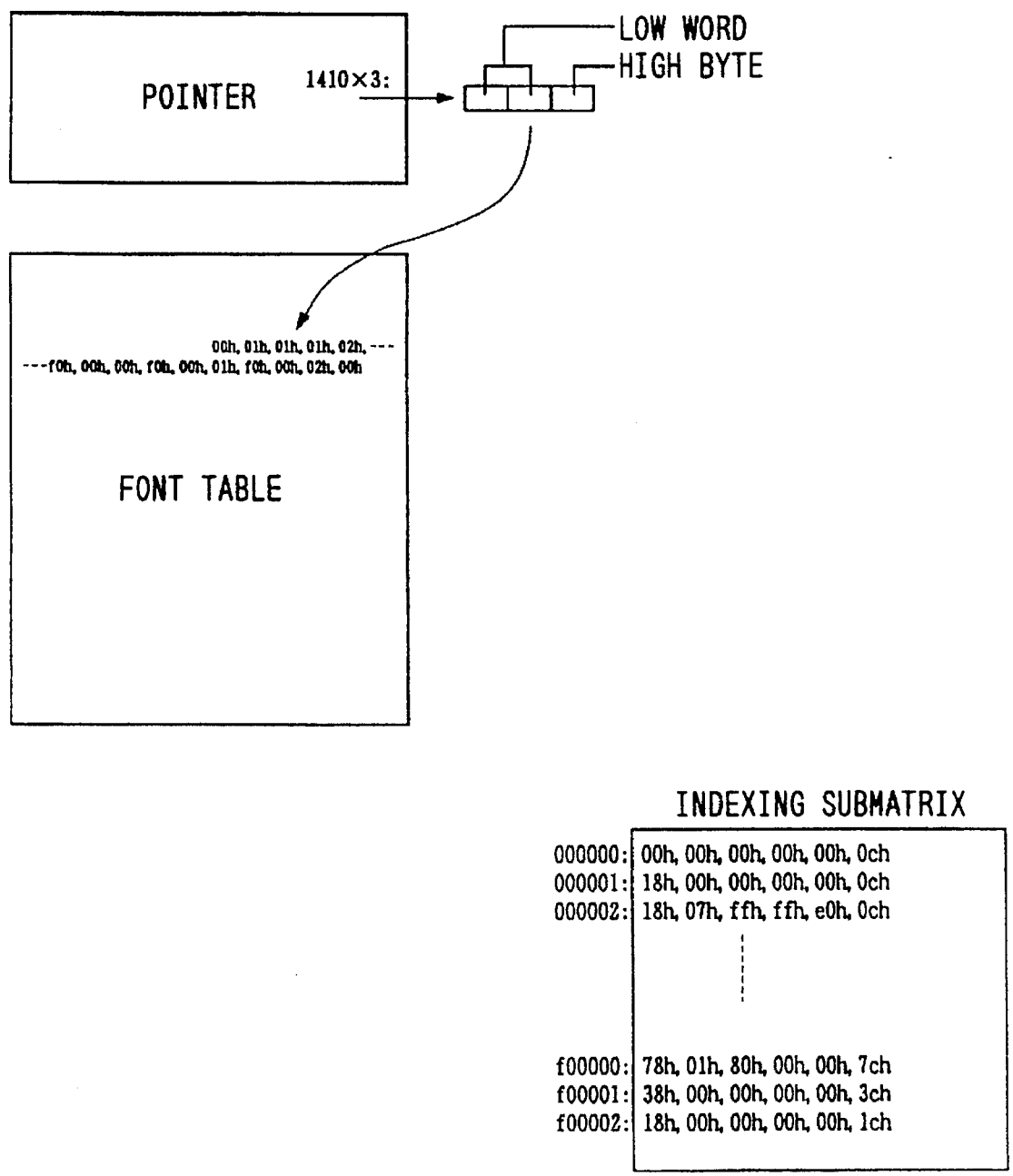
FIG. 5 is a view showing a data structure in the CGROM for the character "田"

An internal character code for a character "田" is 1410 and a pointer and a font table are as shown in FIG. 5. First, at the step S100, 1410×3 is calculated and the content of the pointer indicates the first data of the character "田". For convenience, the content of the pointer is assumed to be 10000h. (FADDR=10000h.) Next, at the step S101, 48 is substituted to the SCOUNTER. Next, the workareas INO1 and INO2 are cleared at the step S102. Next, at the step S103, one byte is taken from the address indicated by the FADDR and is substituted to the INO as the index number (INO=0). Next, it is determined whether the INO is larger than 80h. In this event, INO=0 and thus INO<80h holds, so that the decision becomes "true". Accordingly, the INO2, the INO1 and the INO (00h, 00h, 00h) are used as the index numbers at the step S111 with which the indexing submatrix is looked up to write 00h, 00h, 00h, 00h, 00h, 0ch in the print buffer 5.

Subsequently, at the step S111, the FADDR is incremented by one and becomes 1001h. At the step S112, the SCOUNT becomes 47 but it is not 0, so that the decision at the step S113 becomes "false" and the processing thus goes back to the step S103.

Likewise, for 2, 3 and 4 slices, 18h, 00h, 00h, 00h, 00h, 0ch are developed from a sixth address of the indexing submatrix because the index number is equal to 0001h. In this way, an original image of "田" is reproduced up to SCOUNT=4.

When the SCOUNT=4 is reached, the first byte of the index number for this slice becomes "f0h" and thus the decision at the step S104 becomes "false". As a result, at the step S105, the value of the FADDR is incremented by one. Next, at the step S106, the value of the INO (f0h) is copied to the INO1 and a data of one byte (00h) is read out of the address indicated by the FADDR to the INO. In this event, the INO1 is equal to f0h, so that the decision at the step S107 becomes "false", resulting in increment of the FADDR by one at the step S108. At the step S109, the INO1 (f0h) and the INO (00h) are copied to the INO2 and the INO2, respectively. Further, the one-byte content (00h) of the address of the FADDR is read to the INO. Accordingly, the index number in this case becomes f00000h and data of 78h, 01h, 80h, 00h, 00h and 7ch are developed as the print data.

Likewise, (38h, 00h, 00h, 00h, 00h, 3ch), (18h, 00h, 00h, 00h, 00h, 1ch) and (00h, 00h, 00h, 00h, 00h, 0ch) are developed to reproduce "田" to the end.

As mentioned above, according to this embodiment, the index numbers for 128 slices that are most frequently appeared in all fonts are each represented by one byte while the second most frequent 28672 slices are each represented by two bytes, so that the font table can be formed with less bytes.

In fact, describing as for a case where the data for 8120 mincho characters are compressed actually according to this invention, the slices for all characters are: 8120×48= approximately 390 thousand (of which approximately 160 thousand are each represented by one byte and approximately 25 thousand slices are allowed to be looked up at two byte for each).

If they would be indexed simply in a conventional way, three bytes are required for the index of the font table, so that the storage of 3×390 thousand=1 million and 170 thousand bytes is required.

On the other hand, according to the present invention, the number required for the index is a storage of only 16×1+ 2.5×2+(39−16−2.5)×3=approximately 825 thousand bytes.

Thus, according to the present invention, an excellent effect can be expected that extension of the fonts can be realized with a capacity smaller by a difference (345 thousand) between the above mentioned 1 million and 170 thousand and 825 thousand.

Second Embodiment

In a second embodiment, to achieve the extension processing at a higher speed, an index number of one byte and an index number of two bytes are assigned to a pattern of 6-byte slice data of which 5-byte head is represented by 00h and the last byte is represented by less than 80h and to a slice of which 4-byte head is represented by 00h and the fifth byte is represented by a range from 80h to efh, respectively, to so form that the print data=index number for these slices. To the slices other than those described above, the index number of three bytes is assigned.

With this structure, as to the above mentioned one-byte and two-byte indexes, the print data can be developed without looking up the indexing submatrix, allowing the extension processing for these slices at the increased speed.

Details are similar to those described in the first embodiment and thus of which description is omitted. However, they can be readily understood by those skilled in the art.

Third Embodiment

In a third embodiment, an original image is previously subjected to an exclusive OR (XOR) processing to further increase the compression rate.

Figure 6:
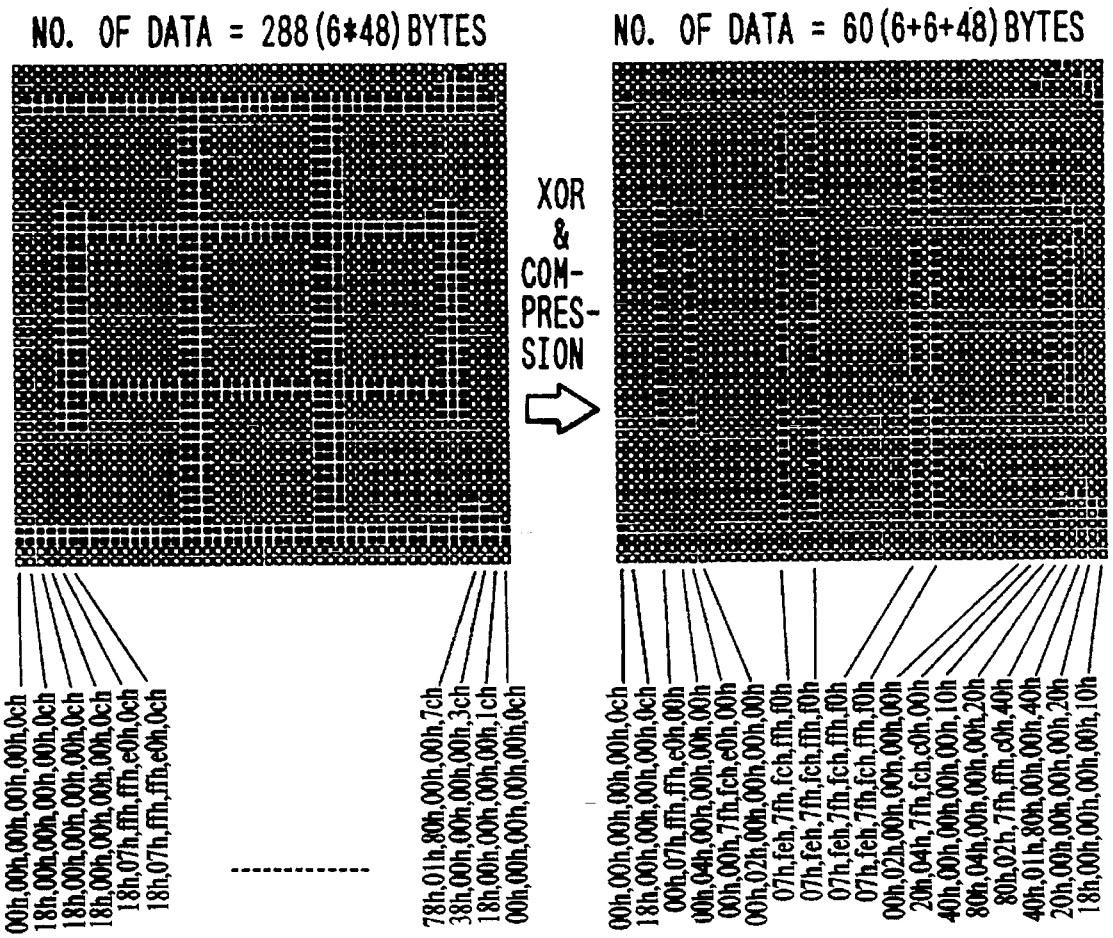
FIG. 6 is a view showing an XOR processing according to a third embodiment.

FIG. 6 is a view showing an exclusive OR processing in which a second slice is exclusively ORed with a first slice. Hereinafter, an N-th slice is exclusively ORed with an (N-1)-th slice (N≧2). A configuration graphic pattern so differentiated is considered as an original and the processing of the first embodiment is repeated.

As a result of this processing, the total number of the different patterns in all character slices is reduced. Accordingly, it is readily understood that the effect of the present invention becomes greater as the frequency of appearance of the identical patterns is increased.

The XOR to reproduce the original image may be: the original image may be reproduced by means of developing the configuration font shown in FIG. 6 and then XOR is obtained in each slice, or alternatively, the extension may be made while obtaining an XOR with the previously reproduced slice for each slice.

The XOR processing is well known in the art and description thereof is thus omitted.

Fourth Embodiment

The present invention is described in detail with reference to the drawing. For convenience, description is made regarding to a dictionary type compression method in which the font pattern is divided into M1 rows by N1 columns submatrices to look up the indexes. However, the present invention can be applied to any other compression methods.

Referring to FIG. 1, a fourth embodiment of the present invention is described. In the figure, a reference numeral 1 represents a central processing unit (CPU) which governs various kinds of processing and which reads procedures out of a read-only memory (ROM) storing control procedures shown in FIGS. 10 and 14 to execute them. A reference numeral 2 represents a random-access memory (RAM) comprising areas SCOUNTER, INO, FADDR and PADDR. A reference numeral 3 represents a read-only memory (ROM) for storing the procedures shown in FIGS. 10 and 14. A reference numeral 4 represents a printer while a reference numeral 5 represents a print buffer for use in latching print data to the printer 4. A reference numeral 6 represents a character generator read-only memory (CGROM) which stores compressed fonts. Finally, a reference numeral 7 represents a common bus (SB) for transmitting and receiving data between the CPU and other peripheral devices.

Figure 7:
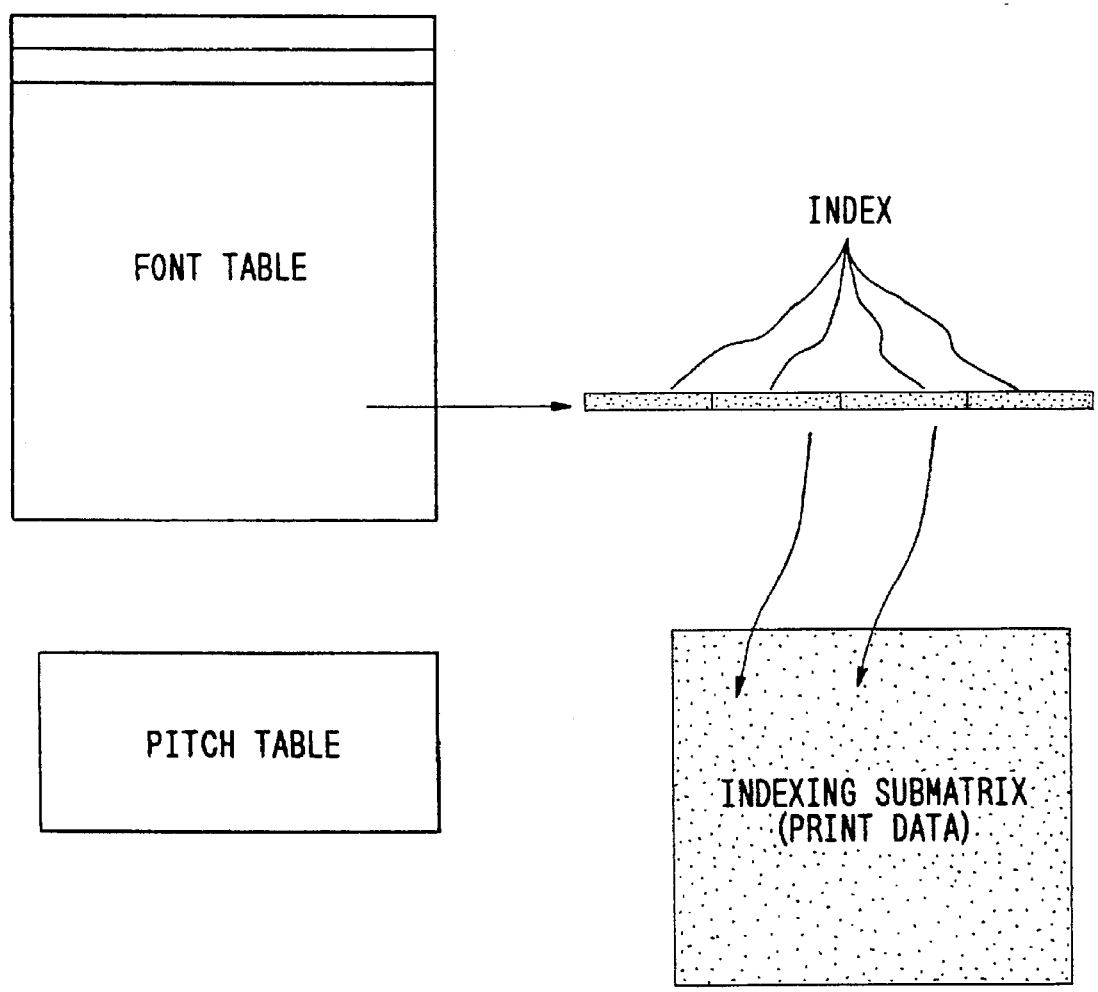
FIG. 7 is a structural diagram of a CGROM according to a fourth embodiment.

Next, structure in the CGROM 6 is described with reference to FIG. 7. The CGROM comprises a font table of a fixed length that has index numbers for use in looking up the submatrices corresponding to patterns forming characters, an indexing matrix looked up according to the index numbers and a pitch table for storing a character width of a font.

Figure 8:
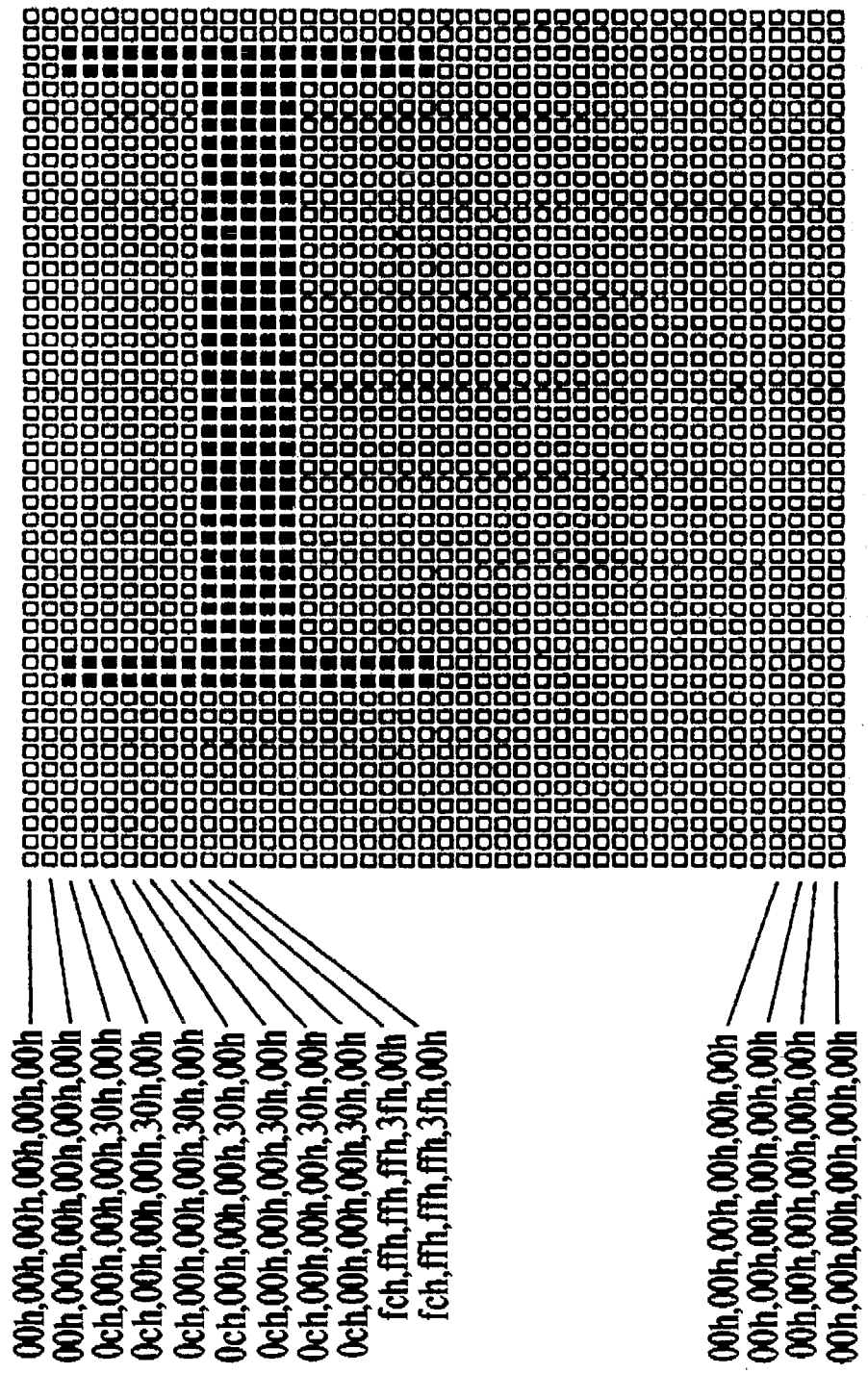
FIG. 8 is a view showing a bit arrangement for a character "T"

In addition, for a font as shown in FIG. 8, logic "1" and logic "0" are assigned to dots consisting of 48 in length by 42 in width bit patterns and to be printed and blank dots, respectively. Further, in this embodiment, an original image is divided into submatrices of 48 dots in length by 1 dot in width (hereinafter, referred to as "slices") for compression. However, applications of the present embodiment are not limited to it. Instead, it can be readily understood by those skilled in the art that equivalent processing can be made for font patterns of any sizes or submatrices of any sizes.

The index consists of three bytes. It is so structured that an index number 0 and an index number 1 look up data of a 6-byte head of the indexing submatrix and data of 6 bytes starting from an offset 6 of the indexing submatrix, respectively. The font table consists of 3 byte by 42 for each character, so that the entire dimension corresponds to 3×42× the number of characters. Finally, the pitch table is so structured as shown in FIG. 11 for storing the character width with one byte for each character code.

In the following description, numerals with a least significant figure to which "h" is added represent hexadecimal numbers while which "b" is added represent binary numbers. Nothing is added to decimal numbers.

Figure 9:
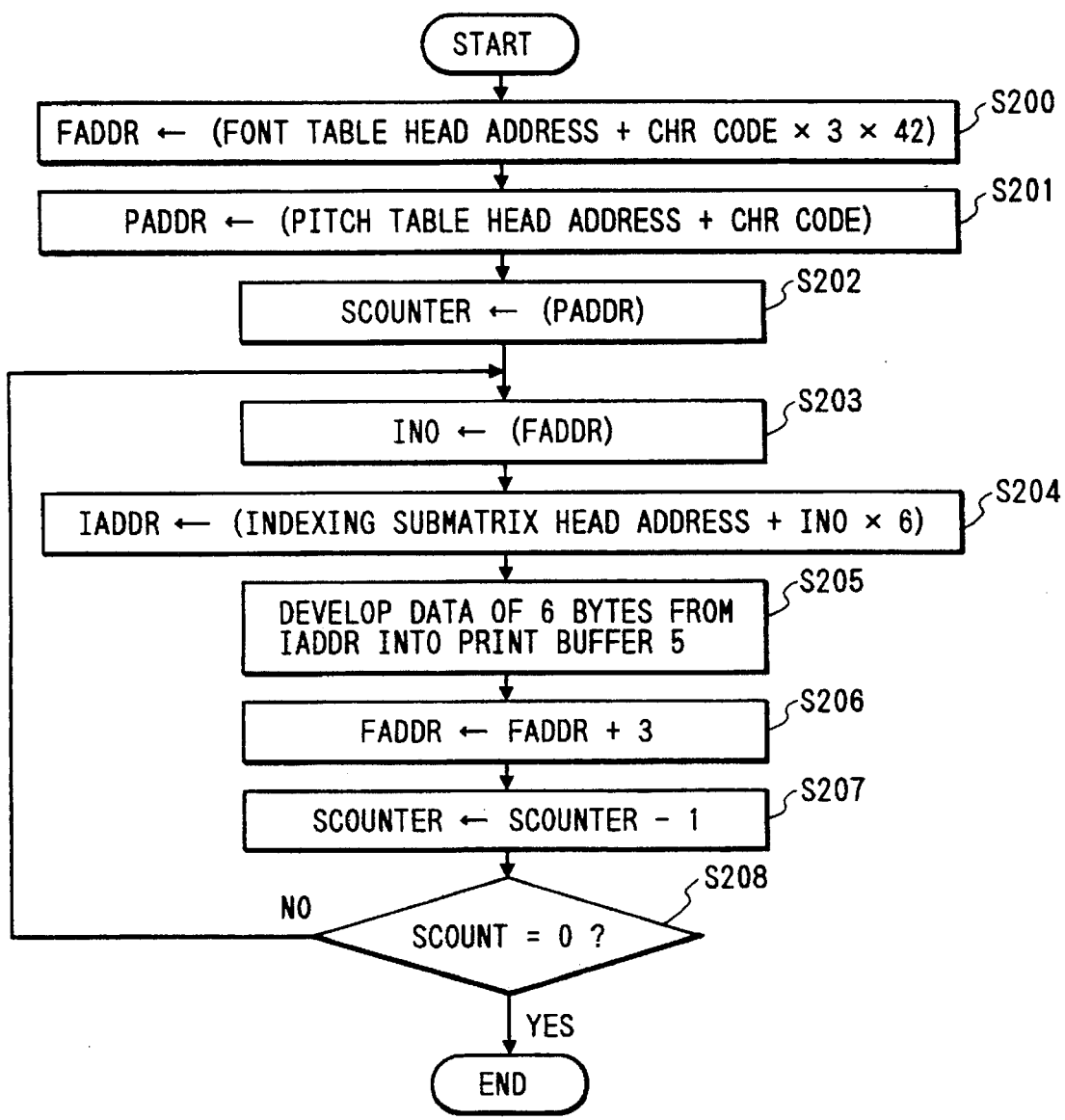
FIG. 9 is a flow chart of a control according to the fourth embodiment.

With the above mentioned structure, an entire control of the CPU 1 is described in conjunction with a flow chart shown in FIG. 9 that is contained in the ROM 3 first.

First, at step S200, the CPU 1 calculates a character code×3×42+a font table head address of a font to be produced and stores it in the FADDR. Subsequently, at step S201, it calculates a pitch table head address+a character code to store it in the PADDR. Next, at step S202, contents of the address represented by the PADDR is substituted into the SCOUNTER by one byte to process by character width slices. (Those in parentheses in the flow chart represent stored contents.) Next, at step S203, contents of the address indicated by the FADDR are copied by three bytes to the INO. Subsequently, at step S204, INO×6+indexing submatrix head address is calculated and stored in an IADDR. Next, at step S205, data of 6 bytes are developed to the print buffer 5 as the print data from the address indicated by the IADDR. Next, at step S206, the FADDR is incremented by three. Then, at step S207, the value of a SCOUNT is incremented by one. Finally, at step S208, it is determined whether the SCOUNT is "0" and the false decision goes back to the step S203. If the decision is true, the processing is ended.

Figure 10:
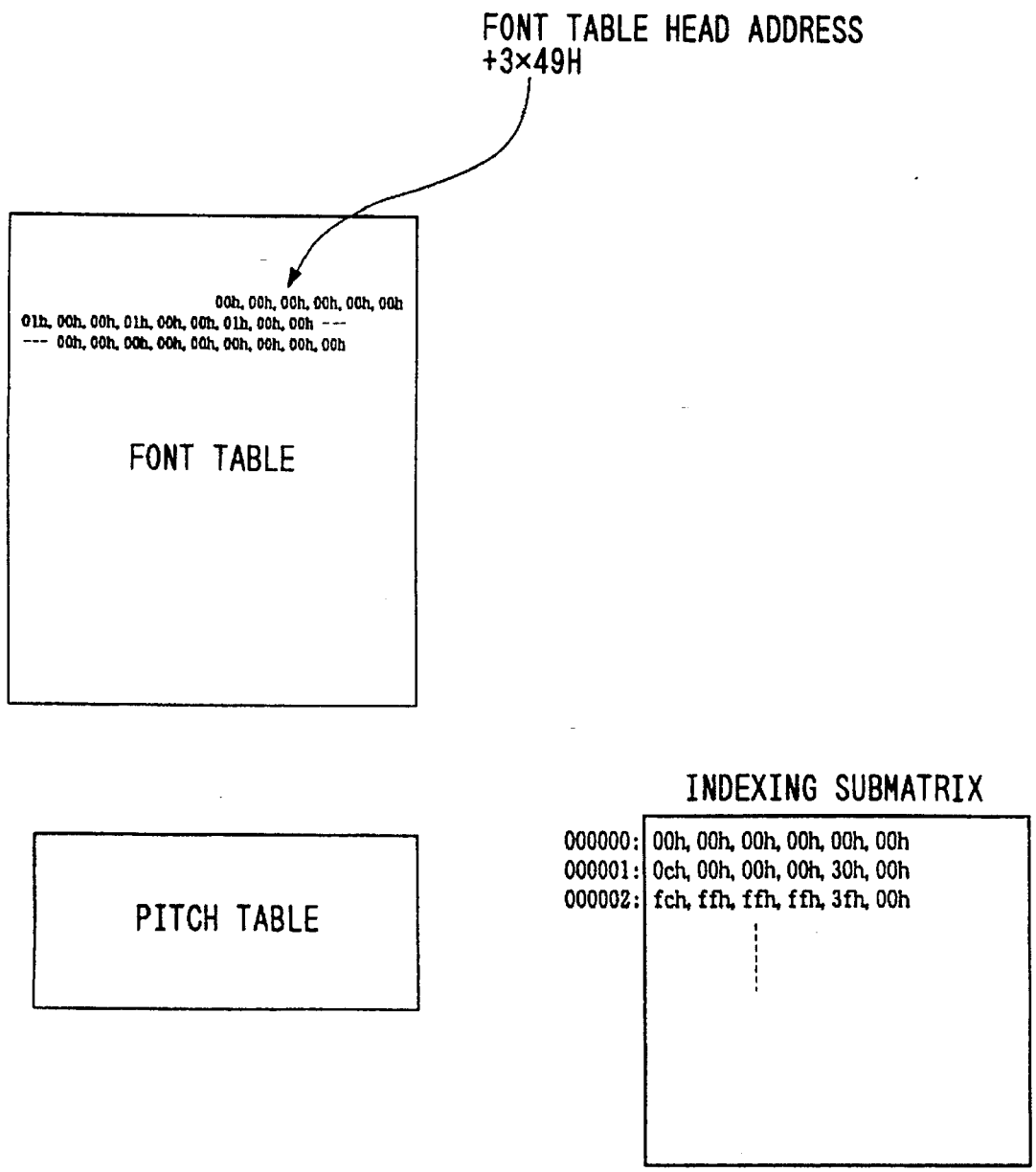
FIG. 10 is a view showing a data structure in the CGROM for the character "T"

Next, description is made with an example in conjunction with FIGS. 10 and 11.

An internal character code (ASCII code) for a character "I" is 49h, so that 49h×3 is calculated at the step S101 and is added to a font table head address (for convenience, the table head address is assumed to be equal to 10000h), which is stored in the FADDR (FADDR=100DBh). Subsequently, at the step S201, the pitch table head address (it is assumed to be equal to 2000h for convenience as in the case of the FADDR) is added to the character code 49h, of which result is stored in the PADDR (PADDR=20049h). Next, at the step S202, contents of the 20049h is substituted into the SCOUNTER (24 is stored in the SCOUNTER according to FIG. 6). Next, at the step S203, three-byte data is obtained from the address indicated by the FADDR and is substituted into the INO as the index number (INO=000000h according to FIG. 5). Subsequently, at the step S204, INO×6=0 and thus the IADDR is used as the head address of the indexing submatrix. Next, at the step S205, 00h, 00h, 00h, 00h, 00h, 00h are written in the print buffer from the IADDR. Next, at the step S206, the FADDR is incremented by three into 100DEh. Finally, at the step S207, the value of a SCOUNT is becomes 23 but is not equal to "0", so that the decision at the step S108 becomes "false" and then processing goes back to the step S103.

Likewise, (00h, 00h, 00h, 00h, 00h, 00h) is developed to the second slice. For 3, 4, 5, 6, 7, 8 and 9 slices, (0ch, 00h, 00h, 00h, 30h, 00h) is developed from a sixth address of the indexing submatrix (of which first one byte is LSB in FIG. 5) because the index number is equal to 000001h. In this way, an original image of "I" is reproduced up to SCOUNT=0. In other words, "I" is reproduced to twenty-fourth slice.

It is noted that the data of twenty-fifth and later slices are not developed.

As mentioned above, according to this embodiment, such an effect can be expected that the print data can be developed into the print buffer without developing the blank data following the character width.

Fifth Embodiment

In a fifth embodiment, the font table has a variable length to delete an unnecessary blank slice in compression as well as in extension in the fourth embodiment.

Figure 12:
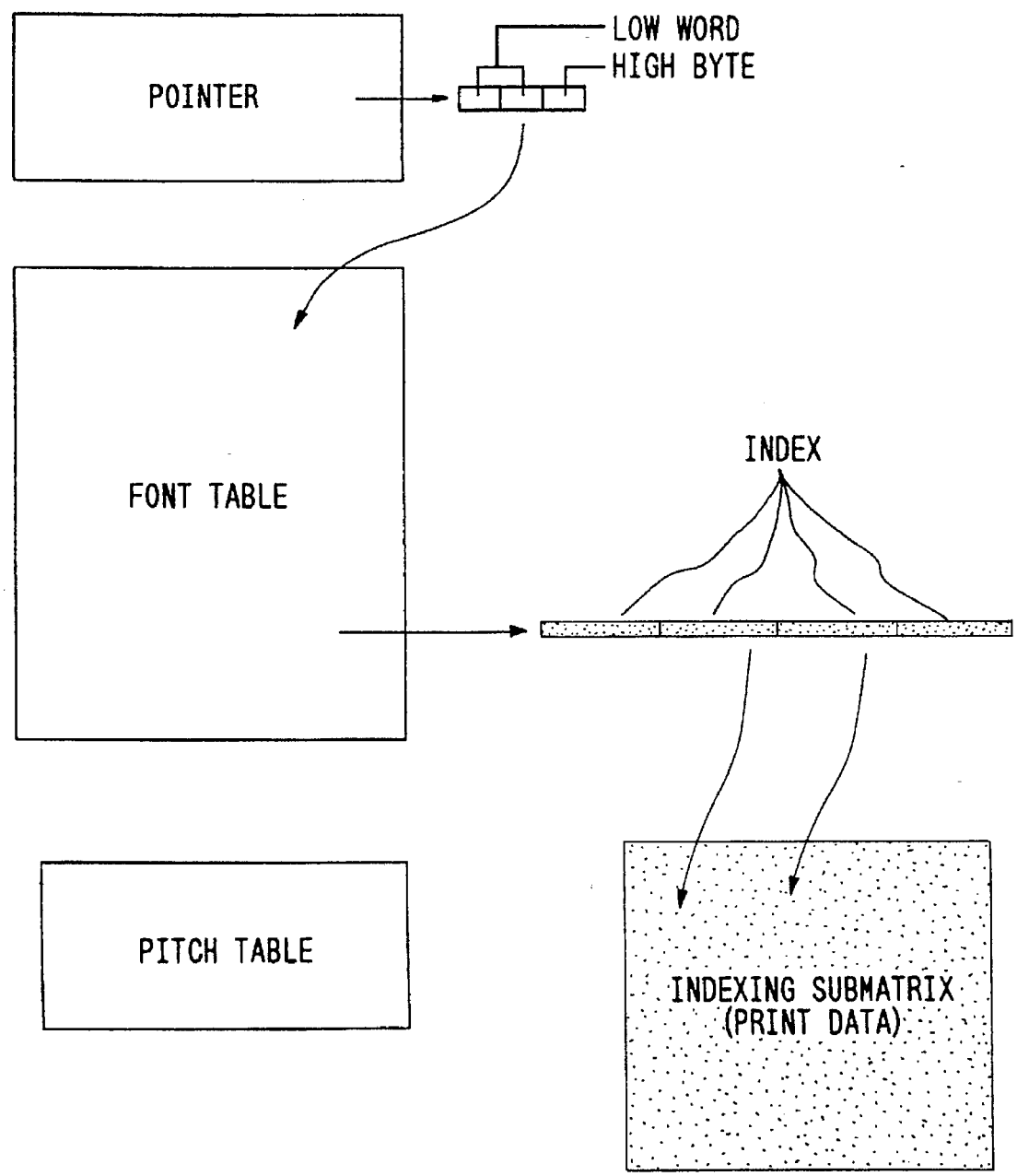
FIG. 12 is a structural diagram of a CGROM according to a fifth embodiment.

FIG. 12 shows a structure of the CGROM according to this fifth embodiment. In the figure, a pointer unit is formed of three bytes for each character code to store a head address of an associated character in the font table. In addition, only the index numbers of the slice data for the character width are stored in the font table.

Figure 13:
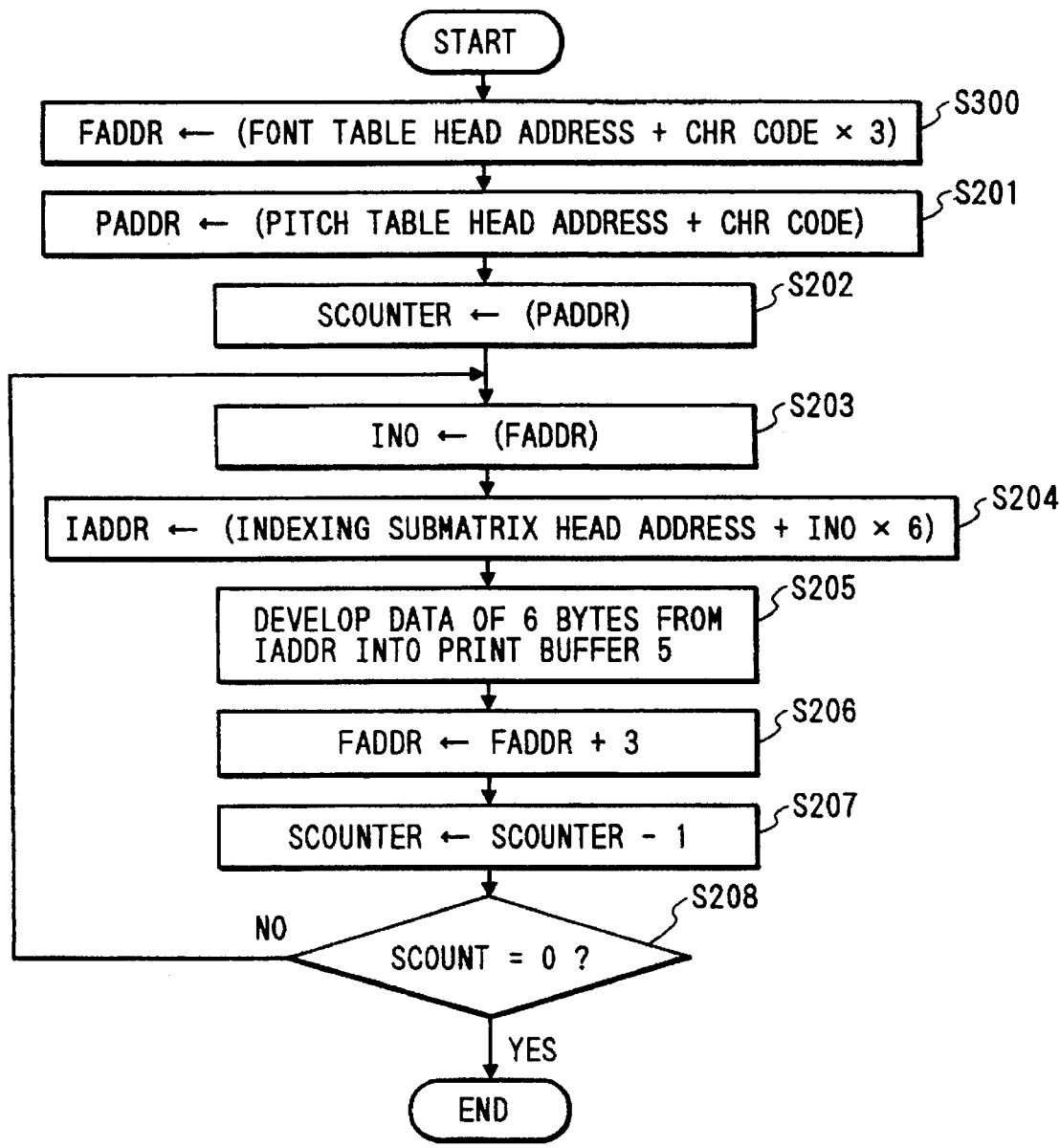
FIG. 13 is a flow chart of a control according to a sixth embodiment.

Control for the fifth embodiment is shown in FIG. 13. In the figure, a difference from the first embodiment is a calculation equation in the FADDR at step S300. In this case, calculated is character code×3+pointer table head address and the contents of the address is stored in the FADDR.

While description is omitted as it is similar to the flow chart shown in FIG. 9 described in conjunction with the first embodiment, the processing carried out at and later the step S300 can be readily understood by those skilled in the art.

In this embodiment, the font table contains no unnecessary blank space following the character width, which permits higher compression rate.

Sixth Embodiment

Figure 14:
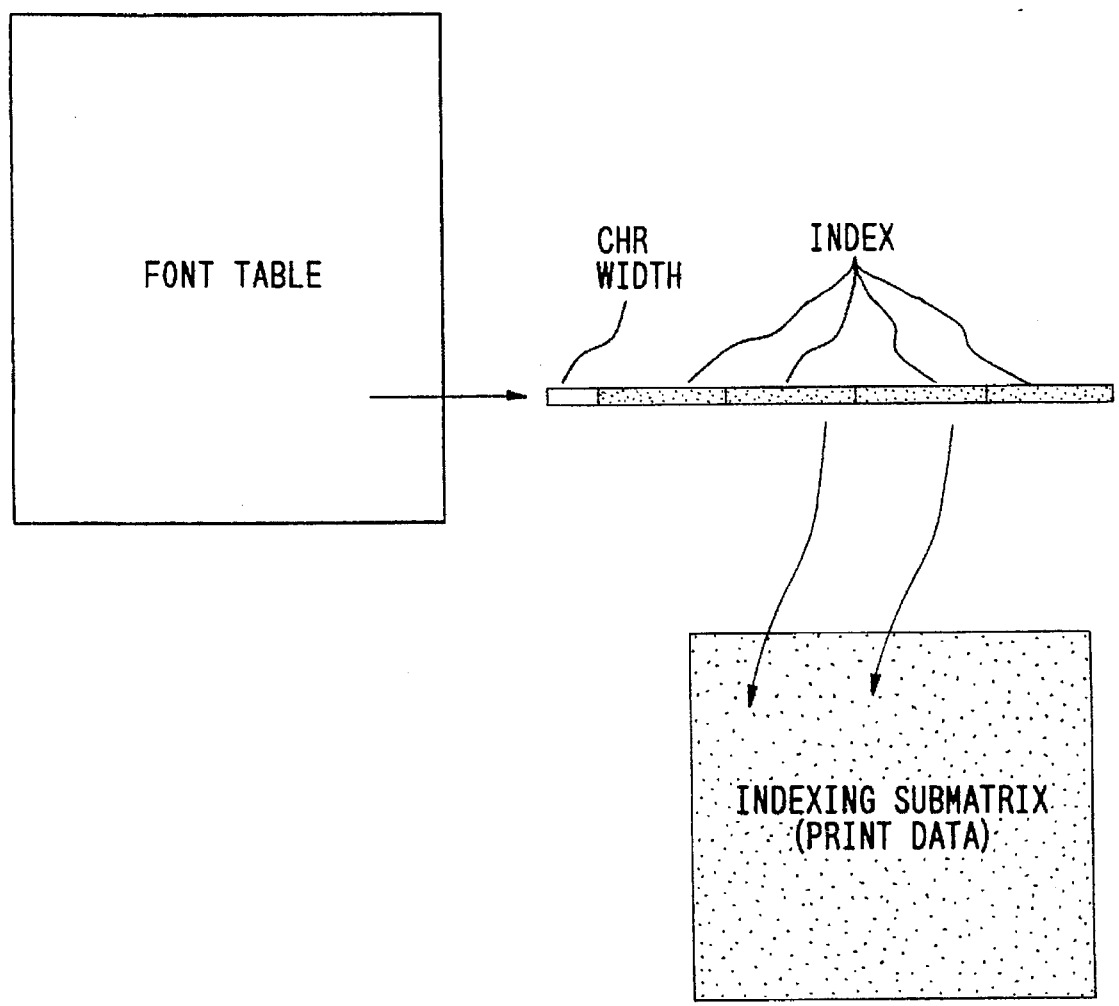
FIG. 14 is a structural diagram of a CGROM according to the sixth embodiment.

FIG. 14 is an example where the character width in the fourth embodiment is stored in the font table with the structure according to a sixth embodiment. In this event, the calculation equation in the step S100 becomes table head address+character code×3×42+1, and the step S101 becomes unnecessary. In addition, it can be readily understood that the contents stored in the FADDR is substituted into the SCOUNTER at the step S102.

Details are similar to those described in the fourth embodiment and thus description thereof is omitted.

Seventh Embodiment

Figure 17:
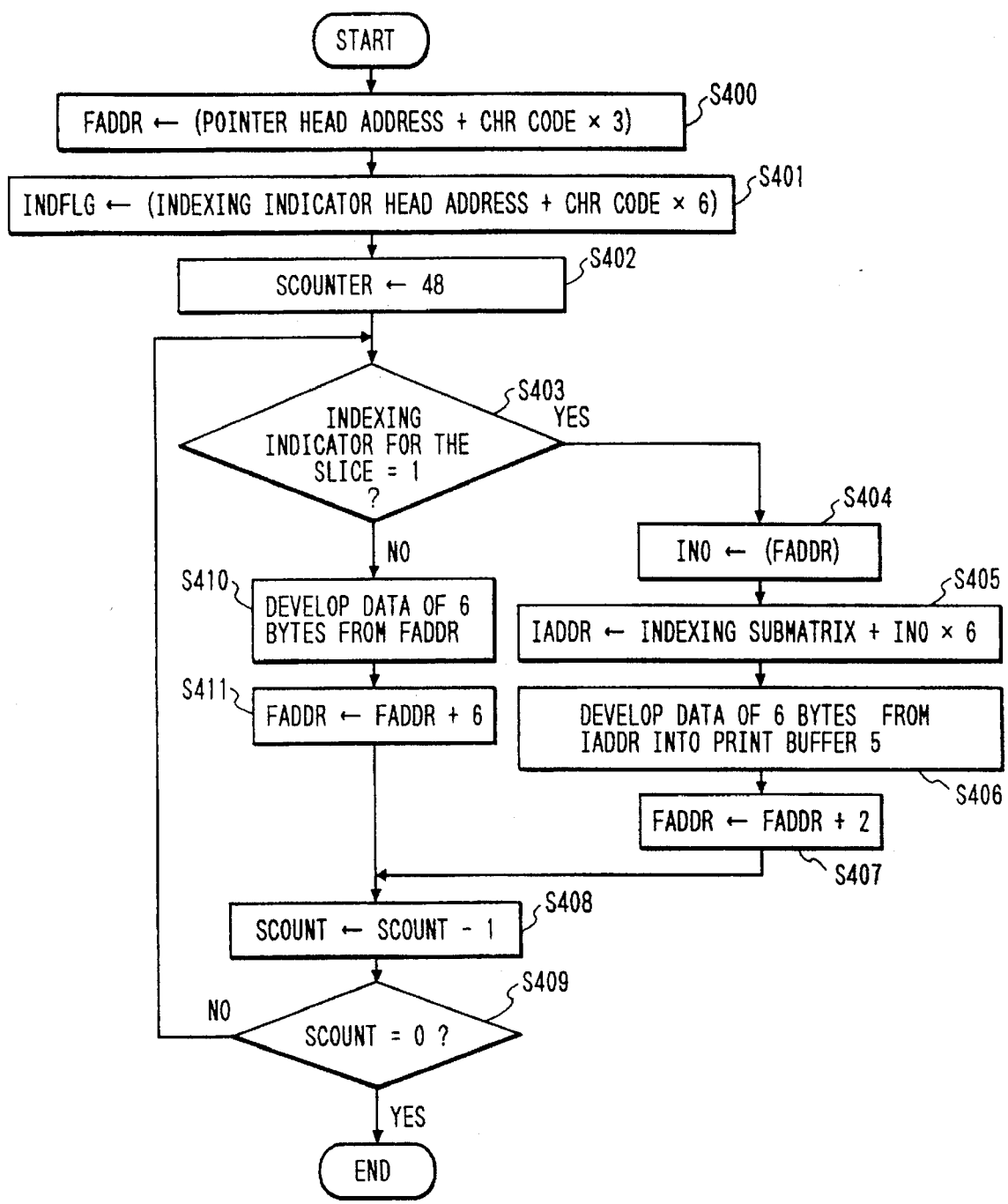
FIG. 17 is a flow chart of a control according to the seventh embodiment.

In FIG. 1 described above, a reference numeral 1 represents a central processing unit (CPU) which governs various kinds of processing and which reads procedures out of a read-only memory (ROM) storing control procedures shown in FIG. 17 to execute them. A reference numeral 2 represents a random-access memory (RAM) comprising areas FADDR, INDFLG, SCOUNTER, INO and IADDR. A reference numeral 3 represents a read-only memory (ROM) for storing the procedures shown in FIG. 17. A reference numeral 4 represents a printer while a reference numeral 5 represents a print buffer for use in latching print data to the printer 4. A reference numeral 6 represents a character generator read-only memory (CGROM) which stores compressed fonts and index indicators according to the present invention. Finally, a reference numeral 7 represents a common bus (SB) for transmitting and receiving data between the CPU and other peripheral devices.

Figure 15:
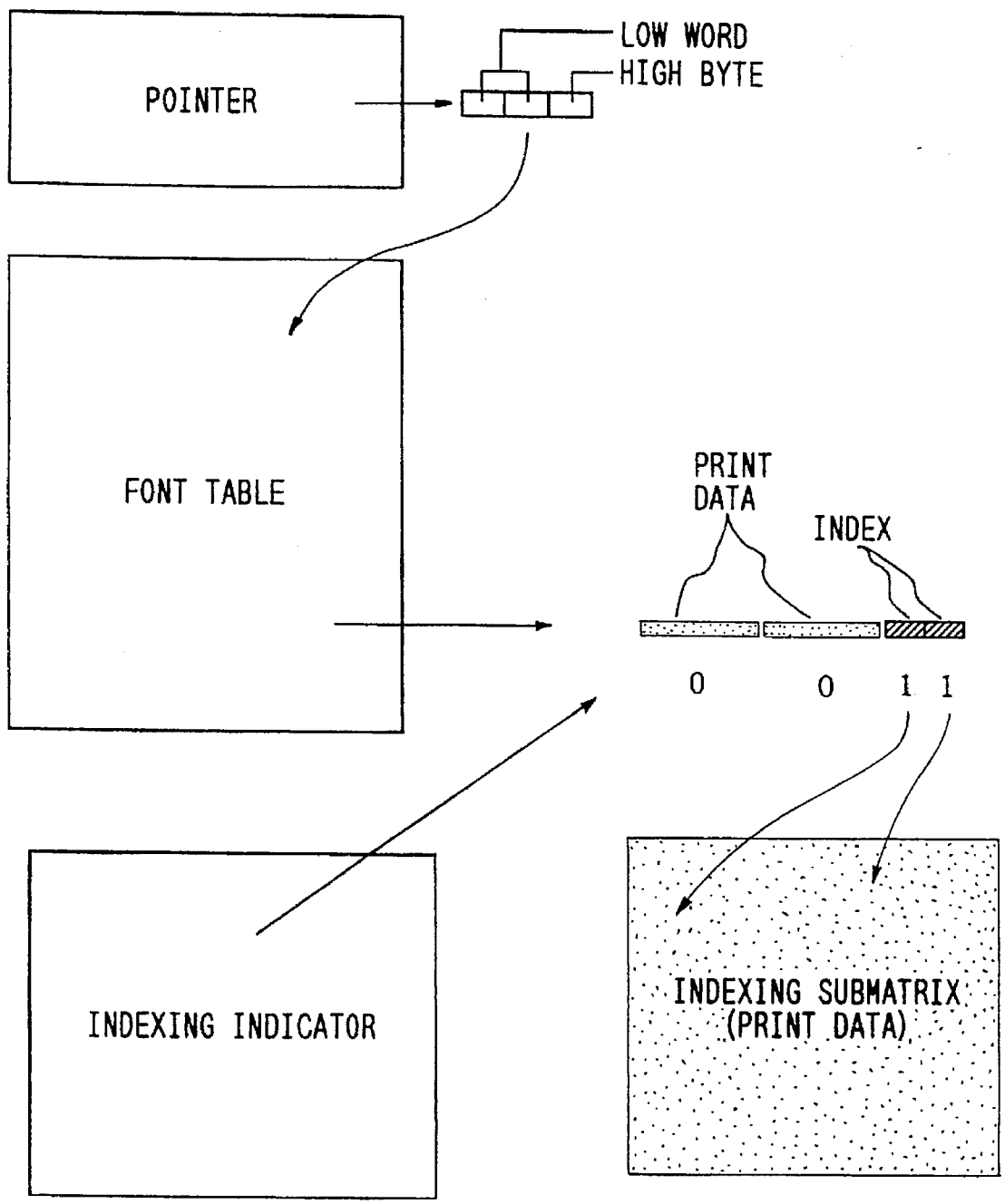
FIG. 15 is a structural diagram of a CGROM according to a seventh embodiment.

Next, structure in the CGROM 6 is described with reference to FIG. 15. The CGROM comprises a pointer unit for storing addresses of a fixed length (three bytes in this embodiment) for characters, a font table unit including indexes (index numbers) looked up according to a pointer, an indexing indicator that indicates an indexing number position in the font table and finally an indexing submatrix looked up according to the index numbers.

In addition, for a font as shown in FIG. 16, logic "1" and logic "0" are assigned to dots consisting of 48 by 48 bit patterns and to be printed and blank dots, respectively. Further, in this embodiment, an original image is divided into submatrices of 48 dots in length by 1 dot in width (hereinafter, referred to as "slices") for compression. However, applications of the present embodiment are not limited to it. Instead, it can be readily understood by those skilled in the art that equivalent processing can be made for font patterns of any sizes or submatrices of any sizes.

In this embodiment, the slices directed to the indexing look-up in the font table are appeared twice or more in all fonts. However, the application of the present invention is not limited to the twice and the indexing look-up can be made for those appeared N times or more. In addition, the indexing indicator of one bit is assigned to each slice and logic "1" and "0" are stored for the slice directed to the indexing look-up and the slice directed to the actual data look-up, respectively. Accordingly, the indexing indicator consists of 48 bits (6 bytes) for each character (see, indexing indicator shown in FIG. 16).

In the following description, numerals with a least significant figure to which "h" is added represent hexadecimal numbers while which "b" is added represent binary numbers. Nothing is added to decimal numbers.

With the above mentioned structure, an entire control of the CPU 1 shown in FIG. 17 that is contained in the ROM 3 is described first.

First, at step S400, the CPU 1 calculates a character code×3+a pointer head address of a font to be produced. An address of a real font data of three bytes stored in that address is stored in the FADDR. (Those in parentheses in the flow chart represent stored contents.) Subsequently, at step S401, calculates is character code×6 bytes+indexing indicator head address and the contents stored in that address is copied by 6 bytes to the INDFLG. Next, at step S402, 48 is substituted as an initial value of the SCOUNTER to process by 48 slices. Next, at step S403, it is determined whether the indexing indicator of the associated slice is logic "1". If the decision is truth, contents of the address indicated by the FADDR are copied by two bytes to the INO at step S404. Subsequently, at step S405, INOX6+indexing submatrix head address is calculated and stored in the IADDR. At step S406, data of six bytes are developed into the print buffer 5 as the print data. Further, at step S407, the value of the FADDR is incremented by two. Next, the value of the SCOUNT is decremented by one at step S408. At subsequent step S409, it is determined whether the SCOUNT is "0". If the decision is false, step S403 is again executed while the true decision results in the end of the process.

On the other hand, when the decision at the step S403 is false, data of six bytes are developed directly from the FADDR to the print buffer 5 as the print data at step S410. At step S411, the FADDR is incremented by six to carry out the step S408.

Next, description is made with an example.

Figure 18:
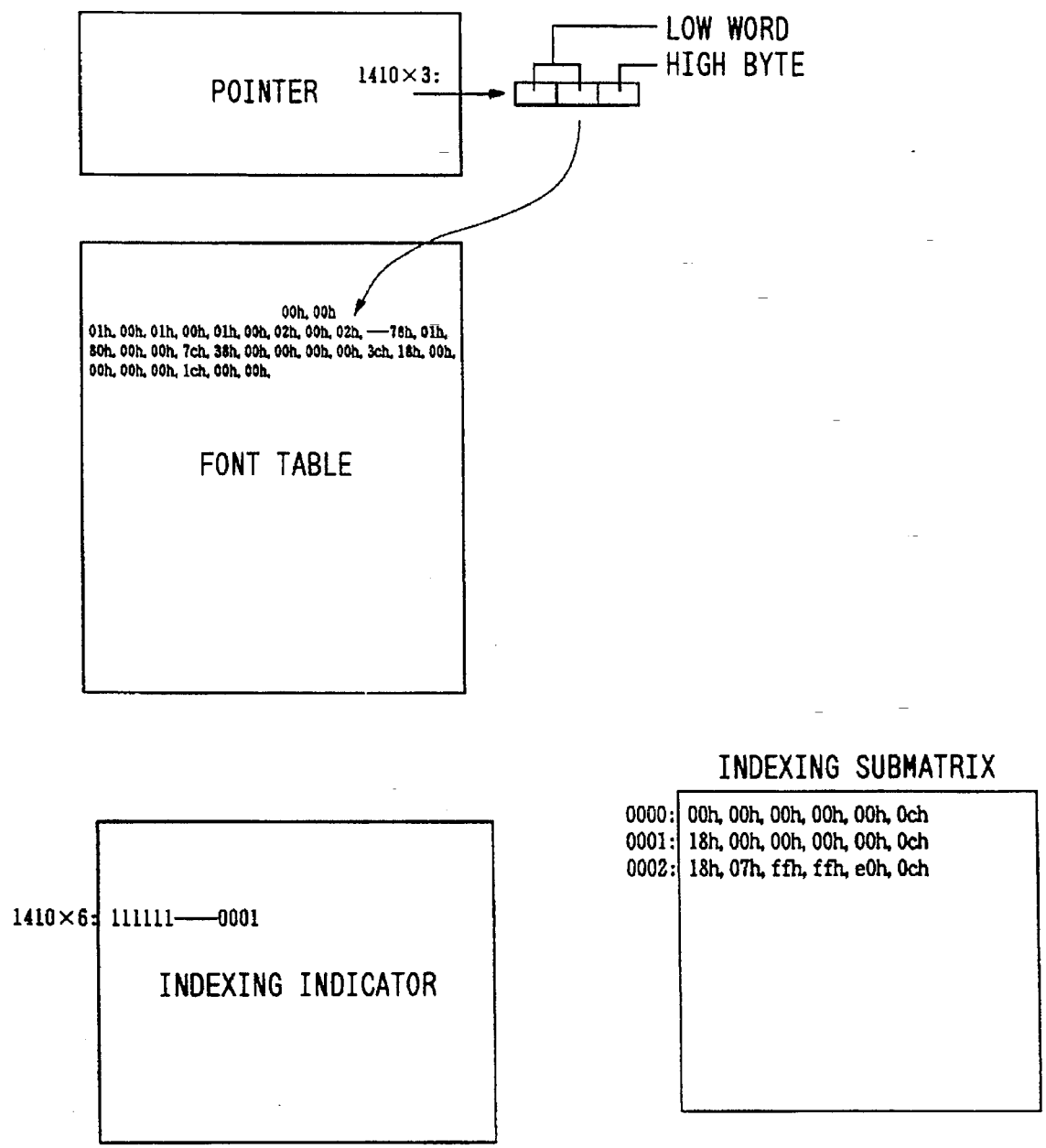
FIG. 18 is a view showing a data structure in a CGROM for the character "田"

An internal character code for a character "囲" is 1410 and a pointer and a font table are as shown in FIG. 18. First, at the step S400, 1410×3 is calculated and the content of the pointer indicates the first data of the character "囲". For convenience, the content of the pointer is assumed to be 10000h. (FADDR=10000h.) Next, at the step S401, calculates is 1410×6 bytes to which the indexing indicator head address is added and the contents stored in that address is substituted into the INDFLG. Next, at the step S402, 48 is substituted into the SCOUNTER. Next, at the step S403, it is determined whether the indexing indicator of the associated slice is logic "1". In this event, the indexing indicator corresponding to the head slice is "1" and thus the decision becomes true. Two-byte data is obtained from the address indicated by the FADDR and substituted into the INO as the index number at the step S404 (INO=0). Subsequently, calculation at the step S405 becomes INO=0, so that the head address of the indexing submatrix is stored in the IADDR. At the step S406, data of six bytes are obtained from the address indicated by the IADDR as the print data (in this embodiment, 00h, 00h, 00h, 00h, 00h, 0ch at the head of the indexing submatrix is stored as the print data).

Next, the AFDDR is incremented by two into 10002h at the step S407. At the step S408, the SCOUNT becomes 47 but is not equal to zero, so that the decision at the step S409 becomes "false" and the step S403 is again executed.

Likewise, for 2, 3 and 4 slices, 18h, 00h, 00h, 00h, 00h, 0ch are developed from a sixth address of the indexing 00h because the index number is equal to 0001h (in FIG. 18, one word is stored in the order of Low and High with a specification of, for example, INTEL). In this way, an original image of "田" is reproduced up to SCOUNT=4.

When the SCOUNT=4 is reached, the indexing indicator for this slice becomes "0" and thus the decision at the step S404 becomes "false". The six-byte data is processed from the FADDR as the print data at the step S410 (in this time, data of 78h, 01b, 80h, 00h, 00h, 7ch are developed from the font table as the print data).

Likewise, "田" is reproduced to the end.

As mentioned above, according to this embodiment, a slice of all fonts that is appeared only at once is in the font table, so that an unnecessary indexing is eliminated and the index look-up can be achieved with less number of bytes.

In fact, describing as for a case where the data for 8120 mincho characters are compressed actually according to this invention, the slices for all characters are: 8120×48= approximately 390 thousand. Of these, there are approximately 160 thousand different patterns, of which approximately 130 thousand patterns are appeared only at once.

If they would be indexed simply in a conventional way, three bytes are required for the index of the font table, so that the storage of 3×130 thousand=390 thousand bytes is required as the index for these once-appeared patterns.

On the other hand, according to the present invention, the number required for the index is a storage of only 160 thousand–130 thousand=approximately 30 thousand patterns. Accordingly, it can be readily understood that 2 bytes are enough for the indexing look-up.

Thus, according to the present invention, (3–2)×(390 thousand–130 thousand) bytes become unnecessary obtained by means of multiplying a difference between the above mentioned 390 thousand bytes and the index, i.e., (3–2) by the number of the index, i.e., (390 thousand–130 thousand). (390 thousand+(3–2)×(390 thousand–130 thousand)=650 thousand). In this event, 6×8120= approximately 480 thousand bytes are required for the indexing indicator. As a result, an excellent effect can be expected that it can be achieved at a capacity smaller by 650–480=170 (thousand) bytes.

In addition, conventional arts require 3 bytes as the index, which is reduced to 2 bytes in this embodiment.

Accordingly, processing becomes by far easy and an excellent effect can be expected that indexing calculation may be omitted for the slices looked up only once.

Eighth Embodiment

Figure 19:
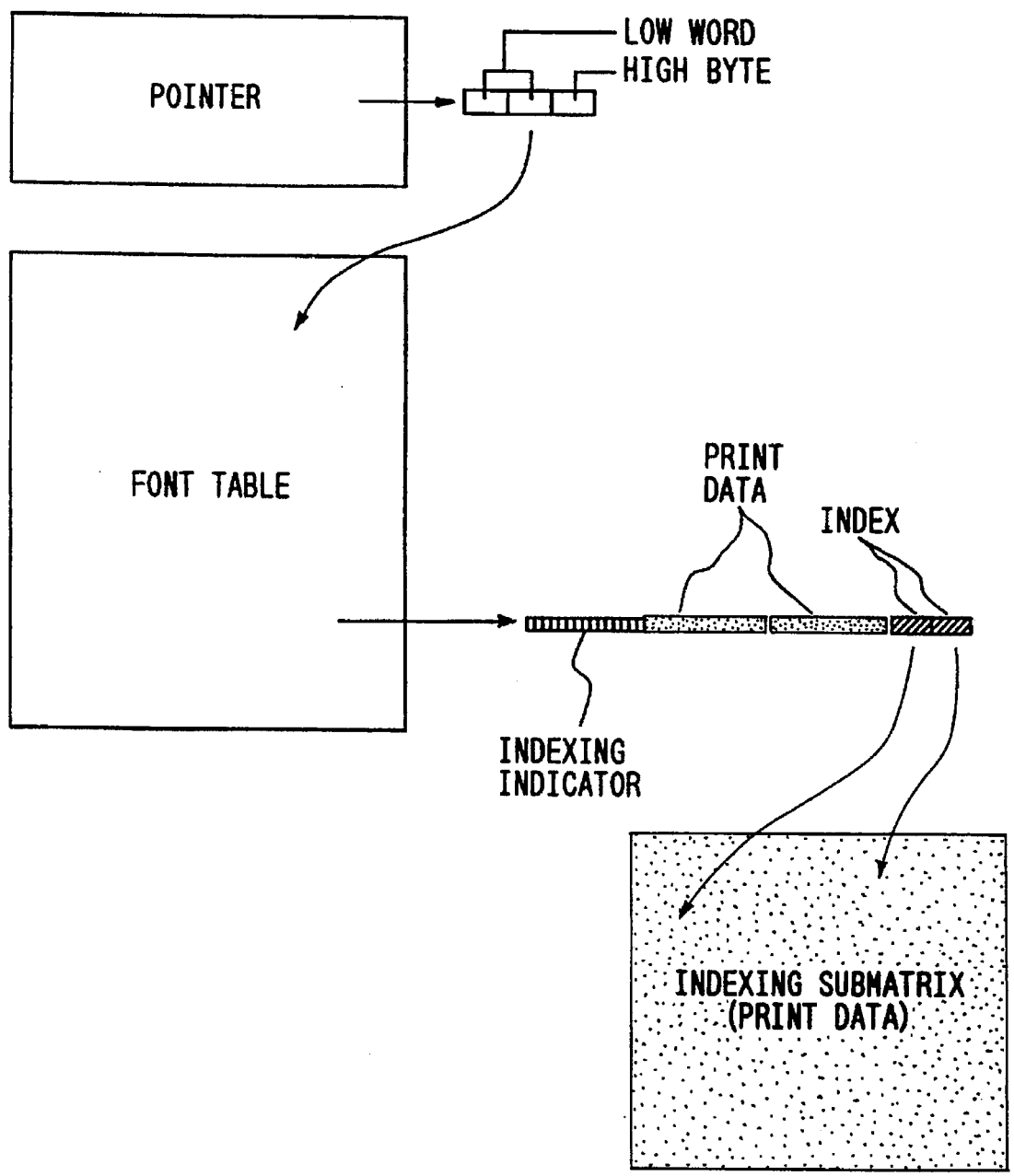
FIG. 19 is a structural diagram of a CGROM according to an eighth embodiment.

FIG. 19 is a structural diagram of a CGROM 6 according to an eighth embodiment. In the eighth embodiment, the indexing indicator itself comprises is provided in the font table for further increase of the speed. In this embodiment, an indexing indicator of 6 bytes is provided just before the font data to eliminate the step S401 in the seventh embodiment. Except for that, this embodiment is similar to the seventh embodiment and thus detailed description is omitted.

Ninth Embodiment

Figure 20:
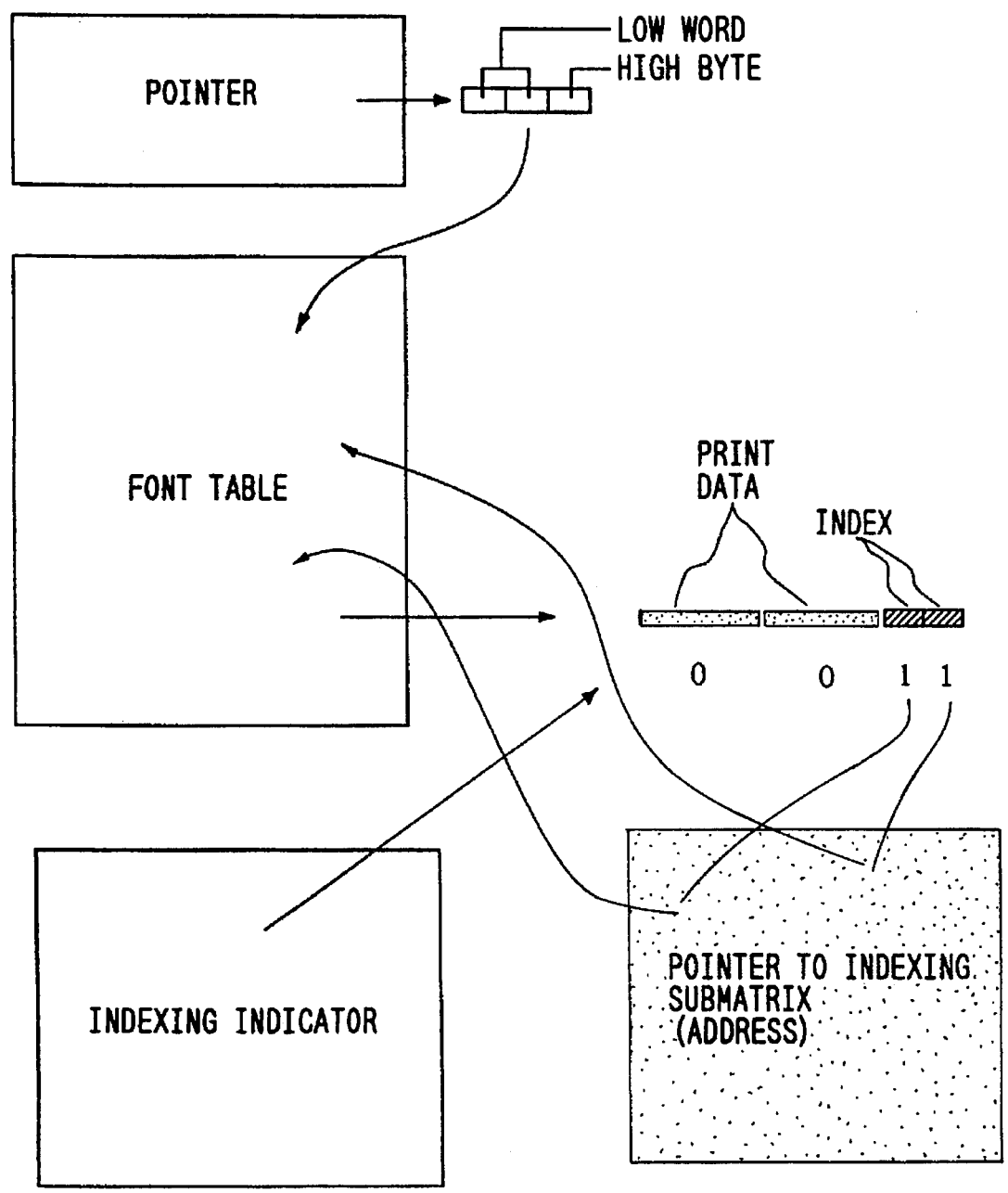
FIG. 20 is a structural diagram of a CGROM according to a ninth embodiment.

FIG. 20 is a structural diagram of a CGROM 6 according to a ninth embodiment. In the ninth embodiment, character data are stored in the font table where the indexing submatrix is first looked up and the indexing submatrix holds the addresses therefor to further increase the compression rate. The CGROM is so structured that the associated indexing indicators of the indexing submatrix stored in the font table are represented by logic "0" and the indexing indicators are represented by logic "1" at and from the second look-up.

In the present embodiment, three bytes are read as a pointer from the IRDDR instead of the step S406 in the second embodiment. From the address indicated by that pointer, as the 6-byte print data, processing is executed, except for which the operation is similar to those described in the seventh embodiment, so that details thereof are omitted.

In this embodiment, the memory can be saved by an amount corresponding to (6–3)×number of indexing submatrices.

Tenth Embodiment

Figure 21:
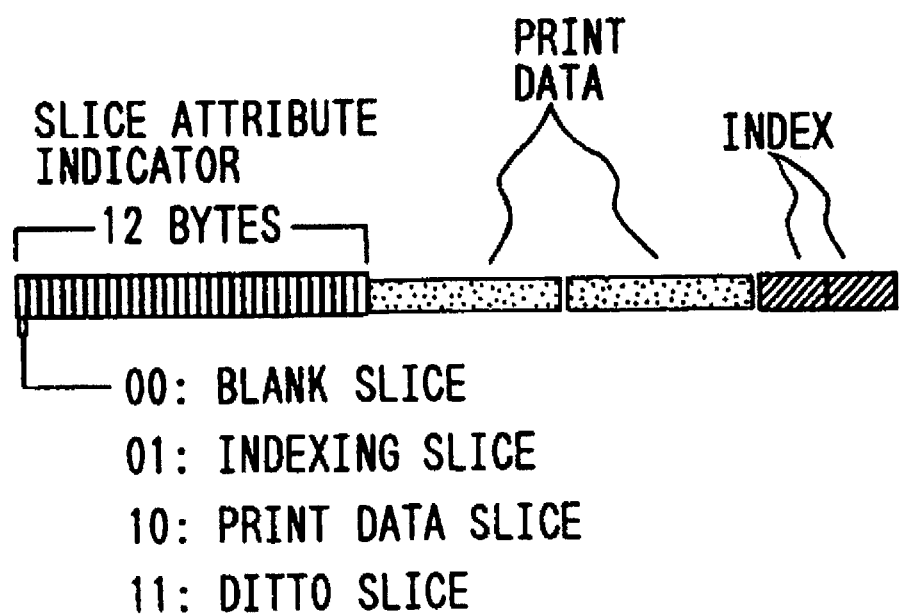
FIG. 21 is a view showing an example of a slice attribute indicator according to a tenth embodiment.

In a tenth embodiment, to further increase the compression rate, it is provided with a blank indicator for indicating a blank slice where no print dot is contained in the slice and with a ditto slice indicator indicating that the entire slice is equivalent or identical to the previous slice. FIG. 21 is a view showing a slice attribute indicator in which the indexing indicator, the blank indicator and the ditto indicator are realized by 2 bits.

More specifically, as shown in FIG. 21, attributes are assigned for each slice by 2 bits and an attribute indicator of 2×48 bits (12 bytes) is provided for every one character.

Figure 22:
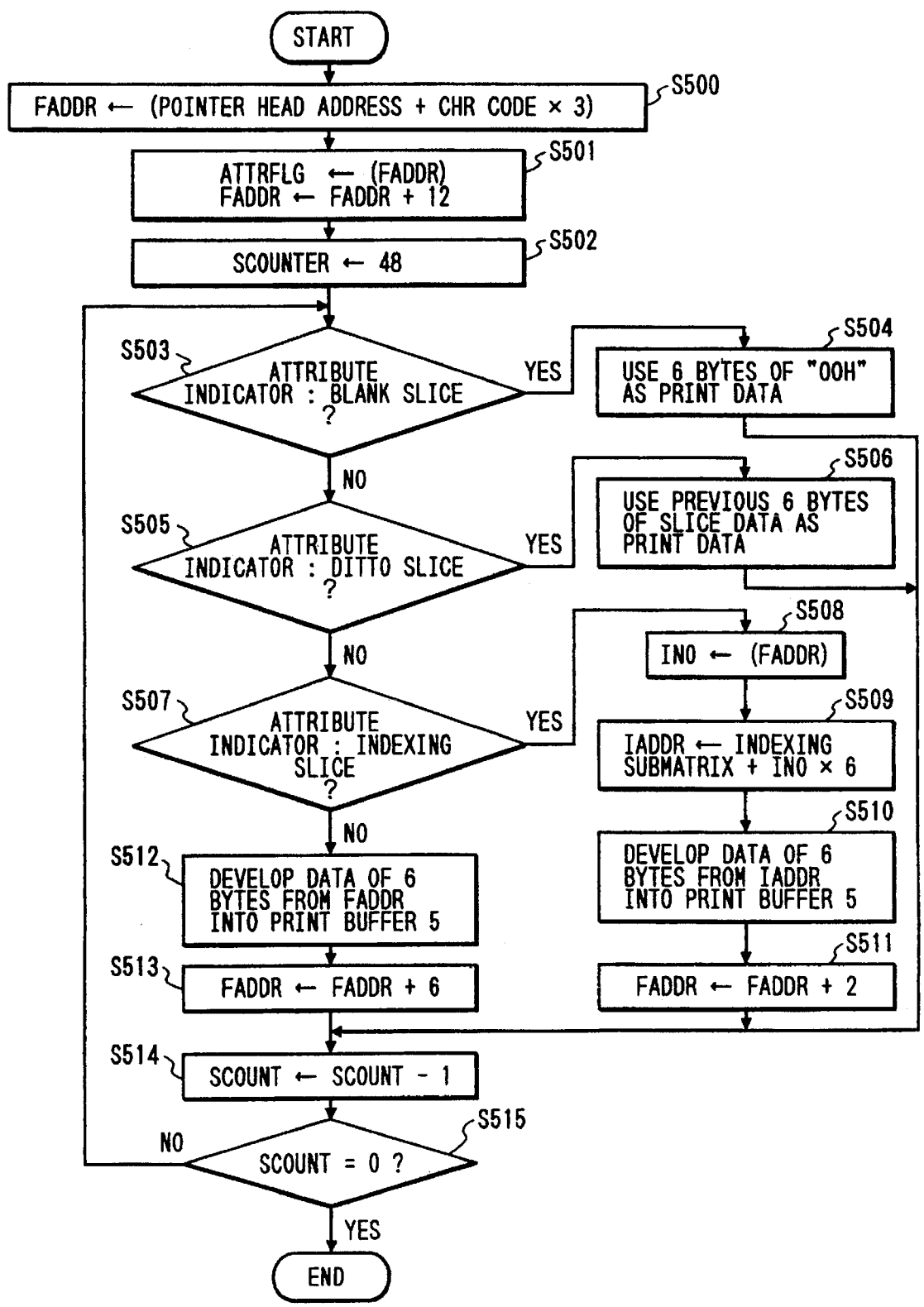
FIG. 22 is a flow chart of a control according to the tenth embodiment.

Next, control procedures carried out by the CPU 1 are described in detail with reference to FIG. 22. Step S500 is equivalent to the step S400 in the first embodiment. At step S501, twelve-byte data is copied from the pointer FADDR to an ATTRFLG. In addition, a pointer FADDR is increased by twelve to indicate the head of the font data. Next, at step S502, 48 is substituted as an initial value of the SCOUNTER to process by 48 slices. Next, at step S503, it is determined whether the attribute indicator (two bits of the associated slice) is in logic "00" according to the ATTRFLG. If the decision is true, step S504 is executed to process 00h of six bytes as the print data and then step S514 is carried out.

On the other hand, if the decision is "false," it is determined at step S505 whether the attribute indicator (two bits of the associated slice) is in logic "11" according to the ATTRFLG. If the decision is "true," step S506 is executed to process previous data of six bites as the print data and then the step S514 is executed. If the decision at the step S505 is "false," it is determined at step S507 whether the attribute indicator (two bits of the associated slice) is in the logic "01" according to the ATTRFLG. If the decision is "true", the contents of the address indicated by the FADDR are copied by two bytes into the INO. Next, at step S509, INO×6+ indexing submatrix head address is calculated, which is stored in the IADDR. Next, at step S510, data of six bytes are developed to the print buffer 5 as the print data from the IADDR. In addition, at step S211, the value of the FADDR is incremented by two. Subsequently, at step S514, the value of the SCOUNT is incremented by one. Next, at step S515, it is determined whether the SCOUNT is "0", and the step S503 is again executed if the decision is false. If the decision is true, the processing is ended.

On the other hand, if the decision at the step S503 is false, the data of 6 bytes are directly developed to the print buffer 5 as the print data from the FADDR. At the step S513, the FADDR is incremented by six and then the step S214 is carried out.

Next, description is made with an example.

Figure 23:
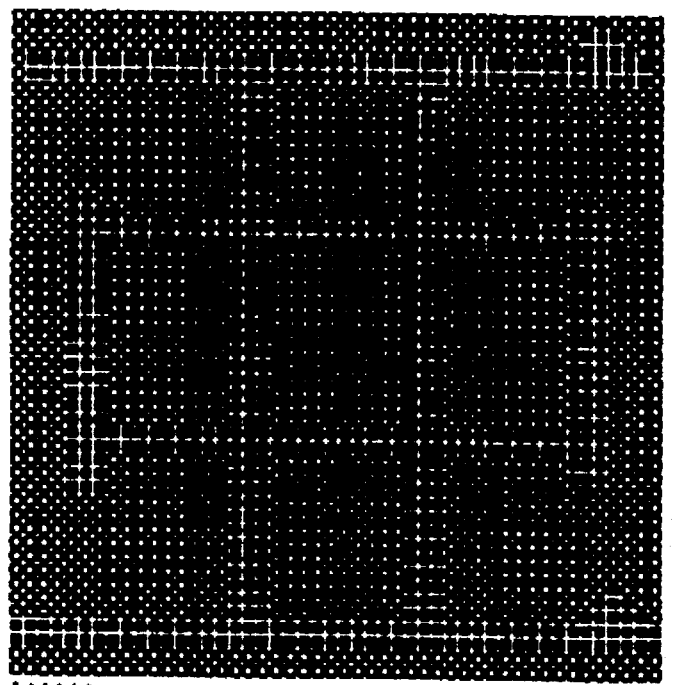
FIG. 23 is a view showing a bit arrangement and an attribute indicator for a character "田"
Figure 25:
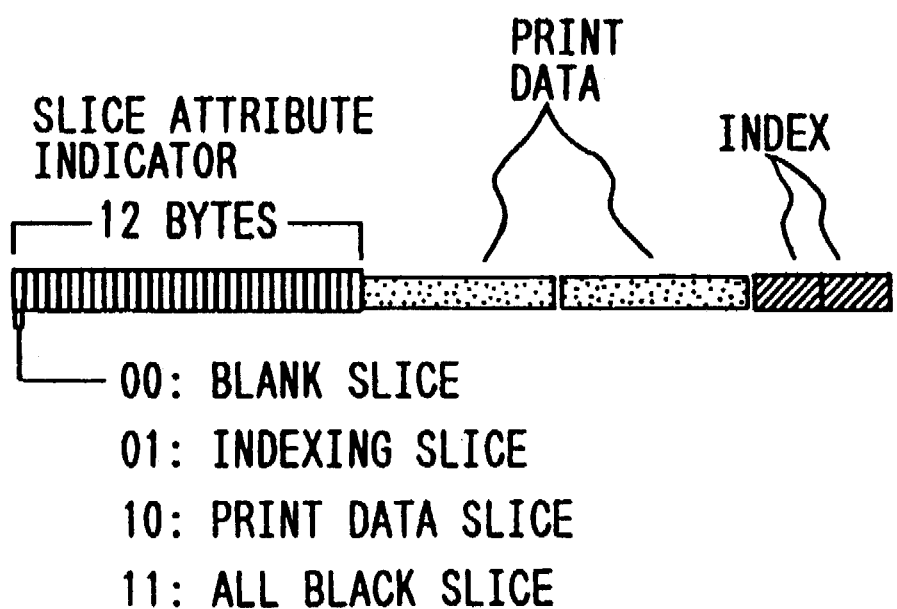
FIG. 25 is a view showing an example of a slice attribute indicator according to the eleventh embodiment.

Processing for the character "田" is described with reference to FIG. 23 regarding only to the difference from the first embodiment.

For the first and the second slices, the first embodiment is repeated. For the third and the fourth slices, the attribute indicator stores "11" that indicates ditto because these slices are equal to the second slice. Accordingly, the decision at the step S505 becomes "true" and the data is taken from the second slice at the step S506, which is processed as the third and the fourth slices. The character "田" is developed in the same manner as described above.

In this event, the font data for the ditto slice such as the third and the fourth slices are not necessary and are thus not contained in the font table. Accordingly, the compression rate is further improved.

Eleventh Embodiment

In an eleventh embodiment, an original image is previously subjected to an exclusive OR (XOR) processing to further increase the compression rate.

FIG. 24 is a view showing an exclusive OR processing in which a second slice is exclusively ORed with a first slice. Hereinafter, an N-th slice is exclusively ORed with an (N−1)-th slice (N≧2). A configuration graphic pattern so differentiated is considered as an original and the processing of the first embodiment is repeated. As a result of this processing, the total number of the different patterns in all character slices is reduced. Accordingly, it is readily understood that the effect of the present invention becomes greater as the frequency of appearance of the identical patterns is increased.

In this embodiment, an all black slice indicator is provided instead of the ditto slice indicator for indicating that the whole slices are print dots. This is because the ditto slice indicator is wasted since the previous slice and the same slice are dealt as the blank slice as a result of the XOR processing.

Accordingly, to further increase the compression rate, the all black indicator is used where all dots are the print dots.

Figure 26:
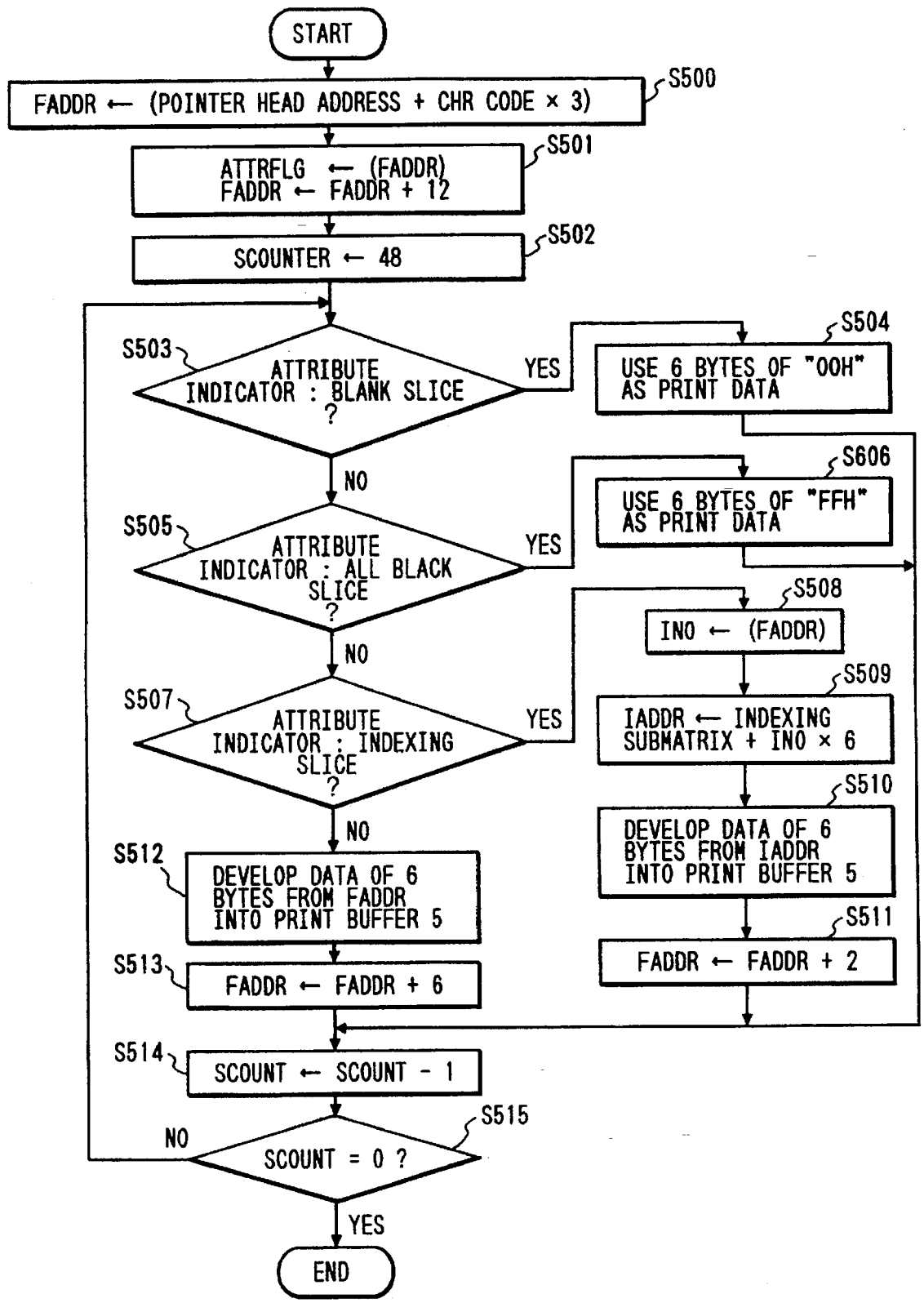
FIG. 26 is a flow chart of a control according to the eleventh embodiment.

FIG. 26 is a flow chart of this embodiment, in which only a difference from the fifth embodiment is that at step S606 ffh of six bytes are processed as the print data rather than processing the previous slice data as the print data. Processing other than the step S606 is similar to that of the flow chart illustrated in FIG. 22, of which description is thus omitted.

The XOR for reproducing the original image may be: the original image may be reproduced by means of developing the configuration font shown in FIG. 24 and then XOR is obtained in each slice, or alternatively, the extension may be made while obtaining a XOR with the previously reproduced slice for each slice.

Twelfth Embodiment

Figure 29:
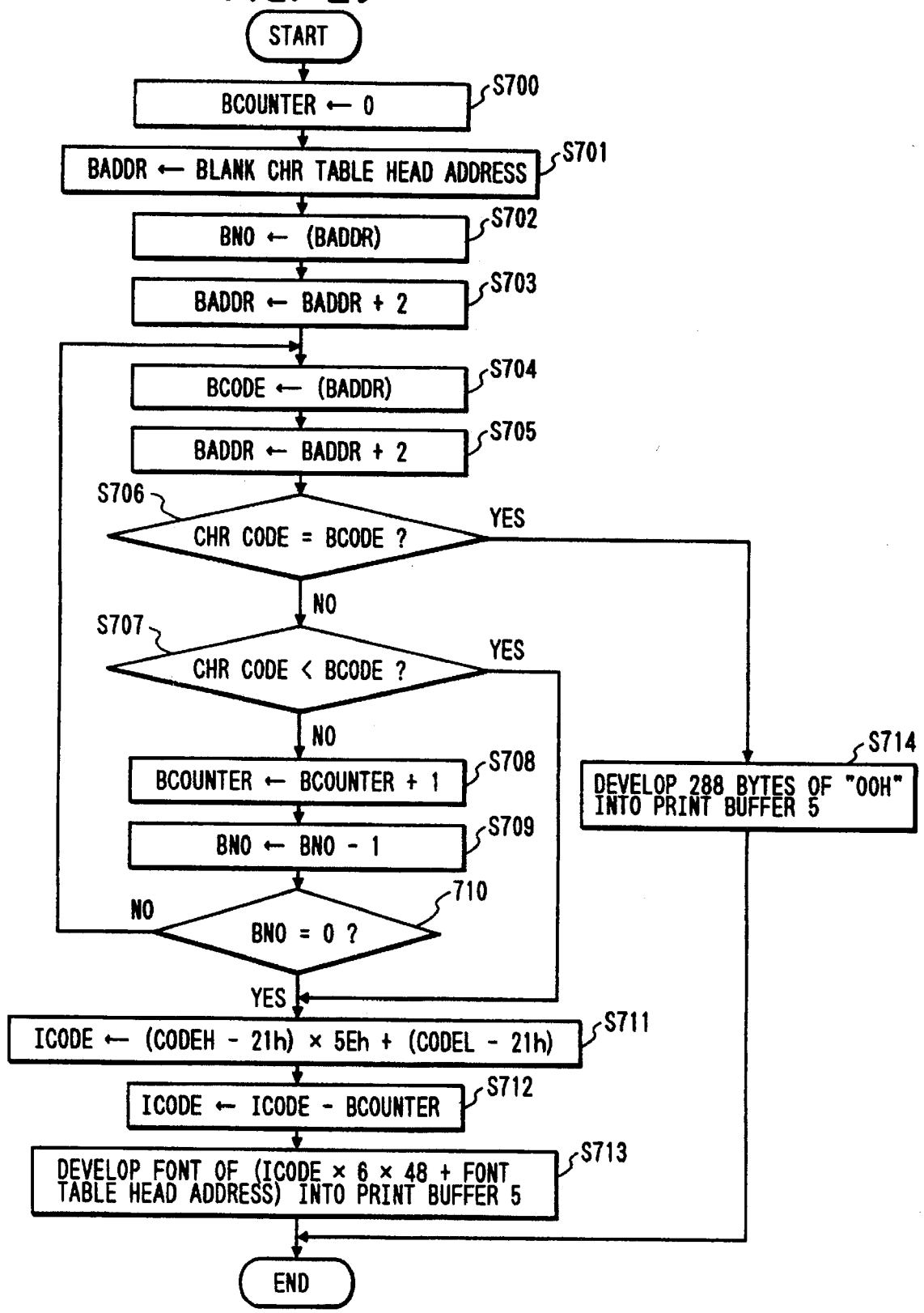
FIG. 29 is a flow chart illustrating a control procedure according to the twelfth embodiment.

A reference numeral 1 represents a central processing unit (CPU) which governs various kinds of processing and which reads procedures out of a read-only memory (ROM) storing control procedures shown in FIG. 29 to execute them. A reference numeral 2 represents a random-access memory (RAM) comprising areas (BCOUNTER, BNO, BADDR, BCODE, ICODE) used in the flow chart shown in FIG. 29. A reference numeral 3 represents a read-only memory (ROM) for storing the procedures shown in FIG. 29. A reference numeral 4 represents a printer while a reference numeral 5 represents a print buffer for use in latching print data to the printer 4. A reference numeral 6 represents a character generator read-only memory (CGROM) which stores compressed fonts and index indicators according to the present invention. Finally, a reference numeral 7 represents a common bus for transmitting and receiving data between the CPU and other peripheral devices.

Figure 27:
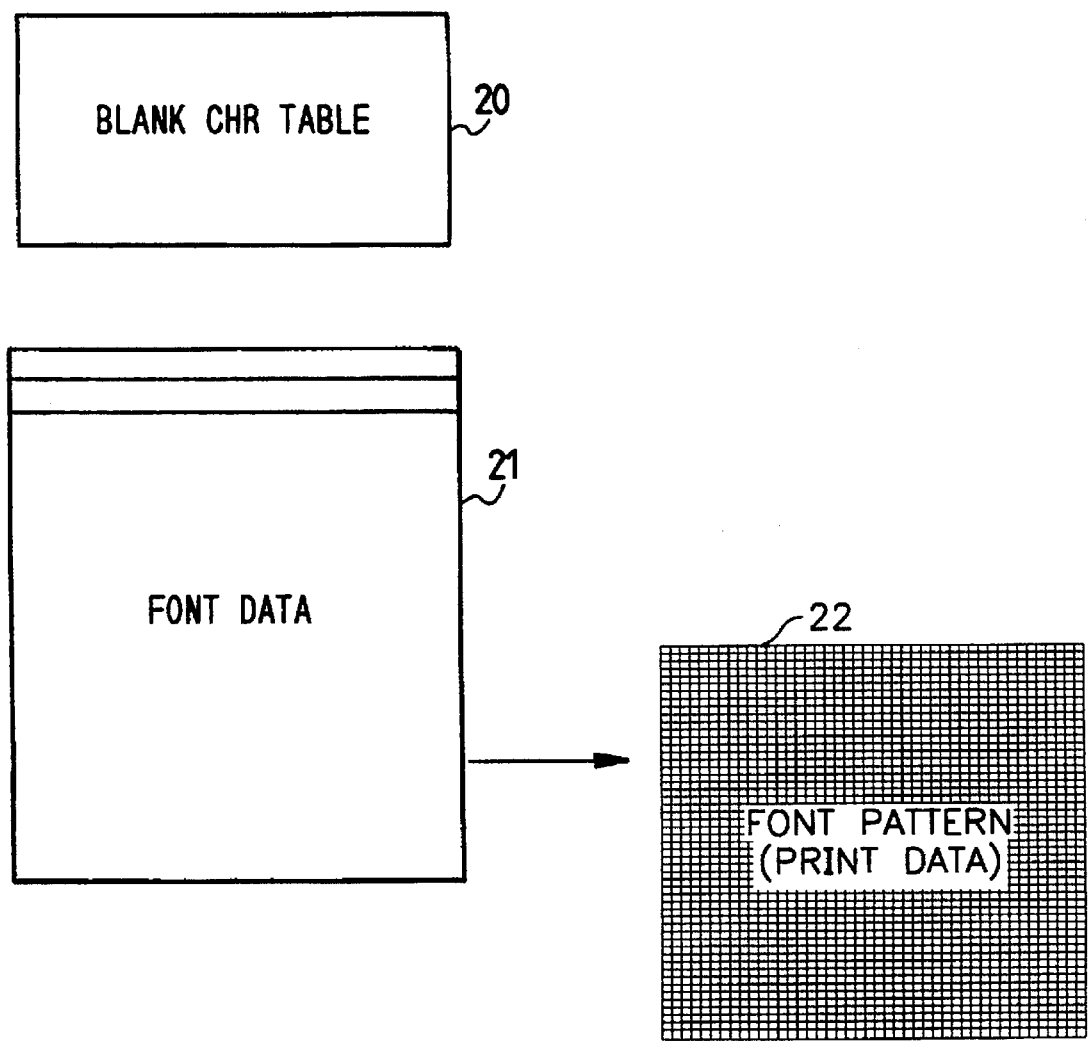
FIG. 27 is a structural diagram showing a CGROM according to a twelfth embodiment.

Next, structure in the CGROM 6 shown in FIG. 1 is described with reference to FIG. 27.

The CGROM comprises a blank character table 20 for storing character codes of blank characters where no dot is the print dot, and a font data area 21 for storing character patterns of characters containing at least one print dot.

Figures 30, 31:
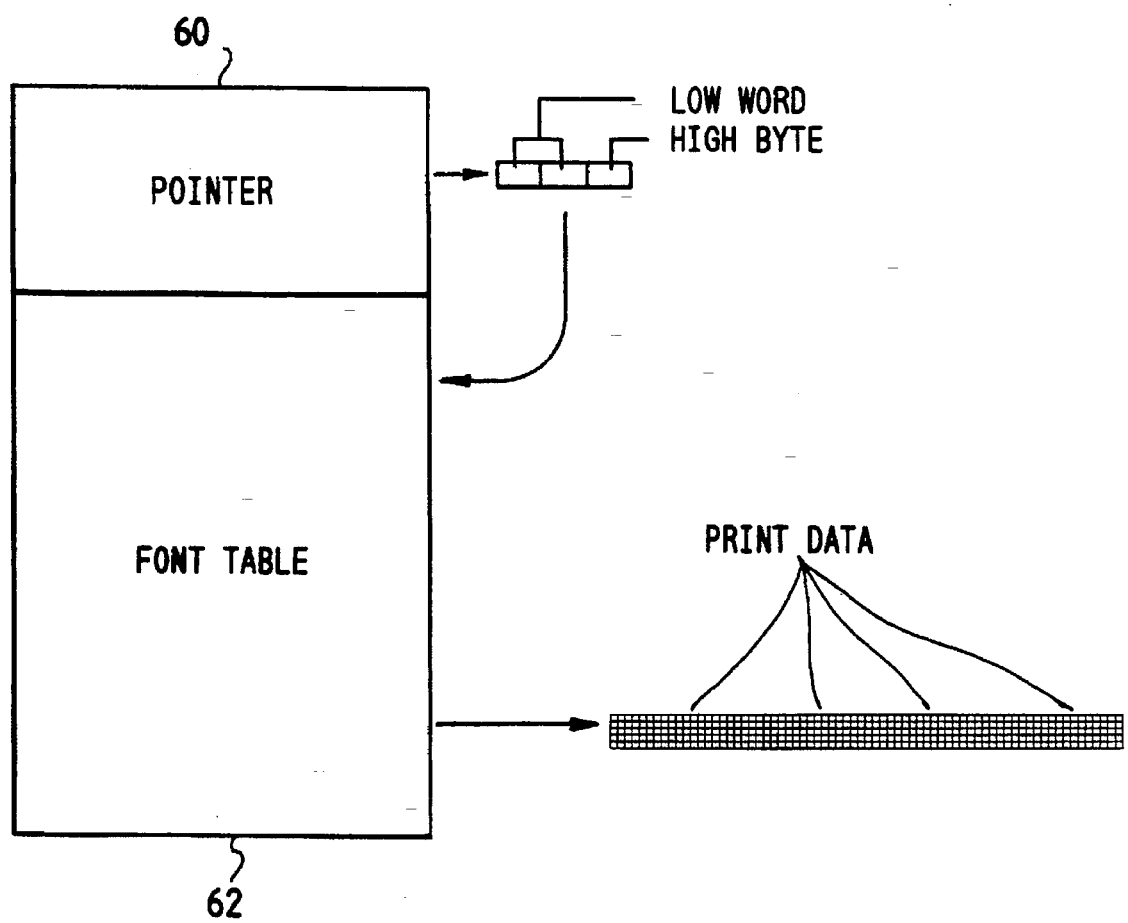
FIG. 30 is a view showing a blank character table according to the twelfth embodiment.
FIG. 31 is a structural diagram showing a CGROM according to a thirteenth embodiment.

In this event, as shown in FIG. 30, at the head of the blank character table 20, the number of the blank characters is stored with two bytes that are stored in the blank character table, following which blank character codes are stored in the incrementing order by two bytes.

Next, the storage in the RAM 2 is described. In this RAM 2, the BCOUNTER, the BADDR, the BNO, the BCODE and the ICODE are used as an area for use in counting the blank character codes, as a pointer in the blank character table, as an area for use in counting the number of the blank characters remaining after the pointer BADDR, as an area for storing the blank character codes and as an area for storing internal codes after conversion from JIS character codes into the internal codes, respectively.

Figure 28:
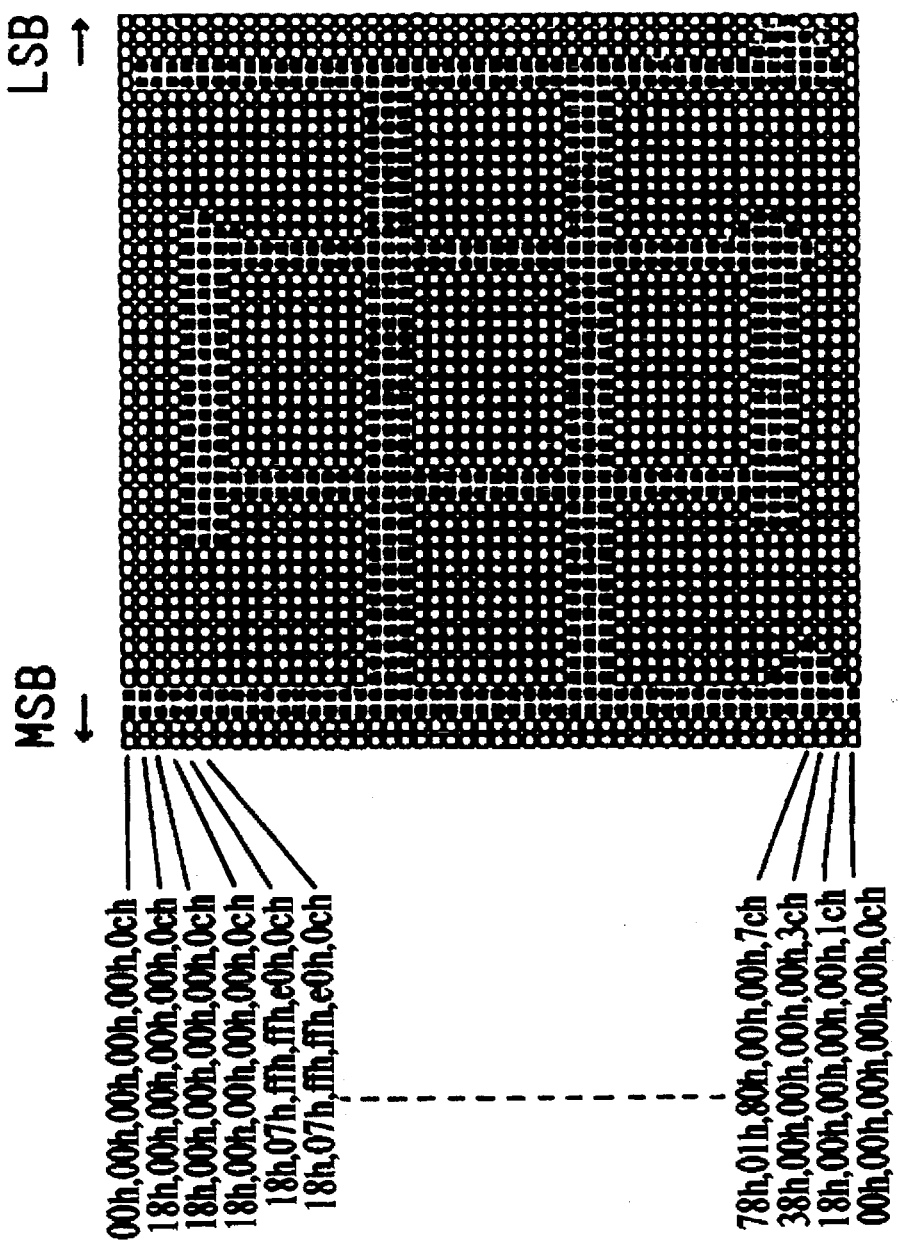
FIG. 28 is a view showing a bit arrangement for a character "田"

The fonts used in this embodiment are, as shown in FIG. 28, formed of dot patterns of 48 bits in length by 48 bits in width and logic "1" and logic "0" are assigned to dots to be printed and blank dots, respectively. Accordingly, one character is formed of 48 by 48 bits, i.e., 288 bytes.

In the following description, numerals with a least significant figure to which "h" is added represent hexadecimal numbers while which "b" is added represent binary numbers. Nothing is added to decimal numbers.

Control to be executed by the CPU 1 is described according to processing procedures (stored in the ROM 3) shown in FIG. 29.

At step S700 (hereinafter, the word "step" is omitted), the CPU 1 clears the BCOUNTER. Next, at S701, a blank table head address is stored in the BADDR.

Subsequently, at S702, the contents of the address indicated by the BADDR are substituted into the BNO by two bytes. Those in parentheses in the flow chart in FIG. 29 represent stored contents.

Next, at S703, the BADDR is incremented by two. Subsequently, at S704, the contents of the address indicated by the BADDR are read by two bytes and stored in the BCODE.

At subsequent S705, the BADDR is again incremented by two. Next, at S706, it is determined whether the character code of the character to be developed is identical to the BCODE.

If the decision at S706 is "true", 00h of 288 (6 bytes in length by 48 slices in width) bytes are developed into the print buffer 5 at S714 to end the processing. If the decision is "false", it is determined whether the character code is smaller than the BCODE. If this decision is "true", then S711 is carried out. If the decision is "false", the value of the BCOUNTER is incremented by one at S708.

Next, at S709, the BNO is decremented by one and it is determined at S710 whether the BNO is equal to "0". If this decision is "false", S704 is again executed. On the other hand, if the decision is "true", an internal code is obtained by means of subtracting 21h from the upper order (CODEH) of the character code of the character to be developed, by which 5Eh is multiplied, which is added to a result of subtraction of 21h from the lower order (CODEL). The internal code so obtained is then stored in the ICODE.

This S711 is for converting the JIS codes into the internal codes (zero offsets), which can be readily understood by those skilled in the art. Subsequent S712 is for skipping the blank characters. At this step, the BCOUNTER is subtracted from the ICODE, which is stored freshly in the ICODE.

Finally, at S713, ICODE×6×48+font table head address is calculated and the associated character font is developed to the print buffer 5 by 288 bytes and then the processing is ended.

Figure 36:
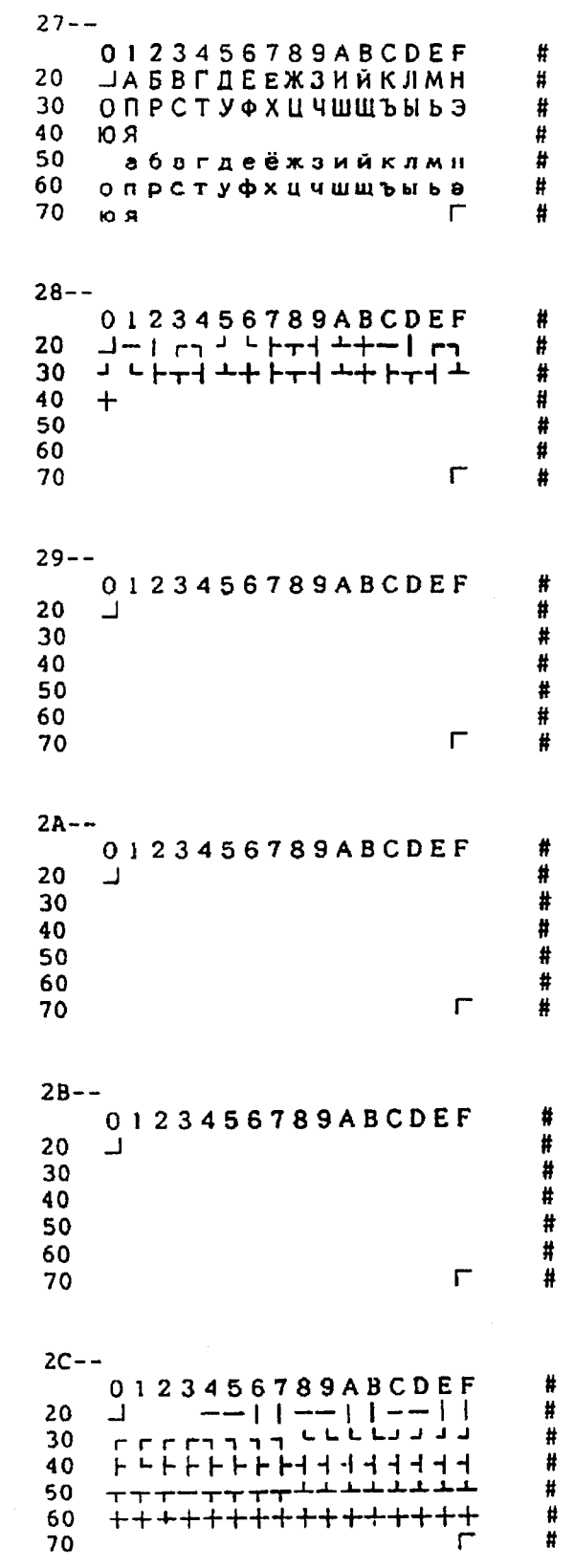

Next, a specific example is described with reference to FIGS. 35 through 37.

First, described is a case where a character code 222Fh is printed. The 222Fh is the blank character, so that it is contained in the blank character table 20 (see FIGS. 27 and 30).

According to FIG. 30, the number of the blank characters is equal to 0322h, so that BNO=0322h holds. Operation from S704 to S710 is looped at 322h times as long as the decision at the S706 or S707 becomes "true". On the other hand, the 222Fh is registered in the second of the blank character of the blank character table, so that the S706 becomes true at the second loop and 00h of 288 bytes is developed to the print buffer 5 at the S714.

Next, described is a case where 255h is printed. BNO is 0322h as in the previous case. 2225h is not contained in the blank character table and is smaller than the second 222Fh, so that the decision at the S707 becomes "true" at the second loop. In this event, it can be readily understood that the BCOUNTER is set to 1.

At the S711, the ICODE is set to 0064h. At the S712, the BCOUNTER i.e., 1 is subtracted therefrom and the ICODE becomes 0063h.

Finally, at the S713, 0063h×6×48+font table head address is calculated. The 2225h is stored in a location of an offset 63h×6×48 in the font table, so that "a black fill of Δ" is printed.

Similarly, positive character development can be made for all character codes.

In this way, according to this embodiment, the print data can be developed to the print buffer 5 without storing a huge amount of blank character data.

Thirteenth Embodiment

FIG. 31 shows a structure of a CGROM 6 according to a thirteenth embodiment to which the present invention is applied. In this figure, a pointer unit 60 consists of three bytes for every character code to store offsets from the printer unit corresponding to the associated character in the font table 62. In addition, 000000h is stored as the pointer if it is specifically a pointer to the blank character.

This is so structured as to assign 000000h to the blank character in order to prevent the address of the first character registered in the font table 62 from being at least 000000h as the last address+1 of the pointer unit 60.

In the font table 62, the font data corresponding to the blank character are not contained as in the case of the twelfth embodiment. Character patterns for those other than the blank characters are aligned in the memory in the order of the character codes by 288 bytes.

Structures other than the CGROM and the font patterns are similar to those described in the twelfth embodiment.

Figure 32:
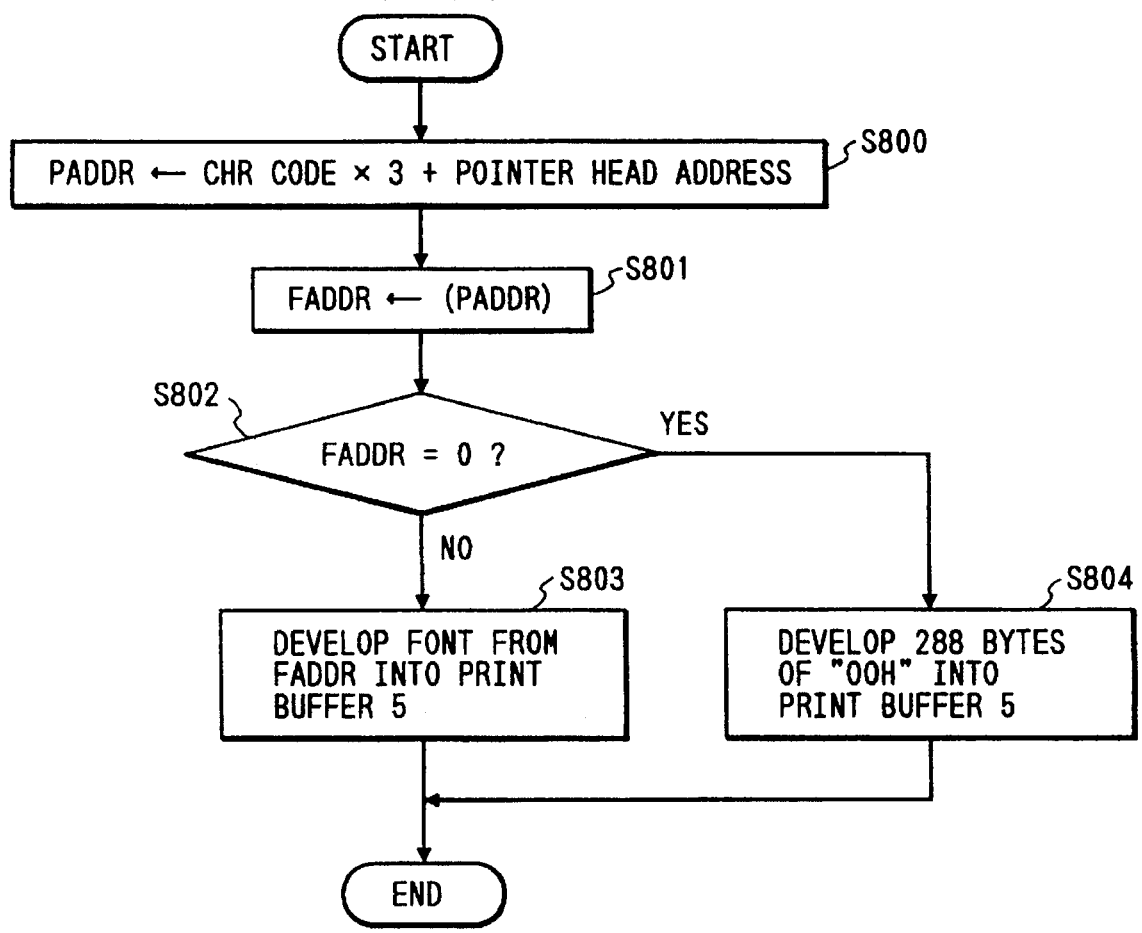
FIG. 32 is a flow chart illustrating a control procedure according to the thirteenth embodiment.

Next, control to be executed by the CPU 1 is described along processing procedures (stored in the ROM 3) shown in FIG. 32.

First, at S800, character code×3+pointer head address is calculated and is stored in the PADDR. Next, at S801, the contents stored in the PADDR are read by three bytes and are stored in the FADDR.

Subsequently, at S802, it is determined whether the FADDR is equal to 000000h. If this decision is "false", S803 is carried out to develop the fonts from the address indicated by the FADDR to the print buffer 5. Then the processing is ended.

On the other hand, if the decision at S802 is "true", 00h of 288 bytes is developed at S804 to the print buffer 5 (see FIG. 1) as in the case of the twelfth embodiment. Then, the processing is ended.

In the case of this embodiment, the addresses in which the blank characters are eliminated are previously stored in the pointer unit, so that calculation as in the twelfth embodiment may be eliminated. However, an equivalent effect can be obtained to those achieved in the twelfth embodiment.

Fourteenth Embodiment

Figure 33:
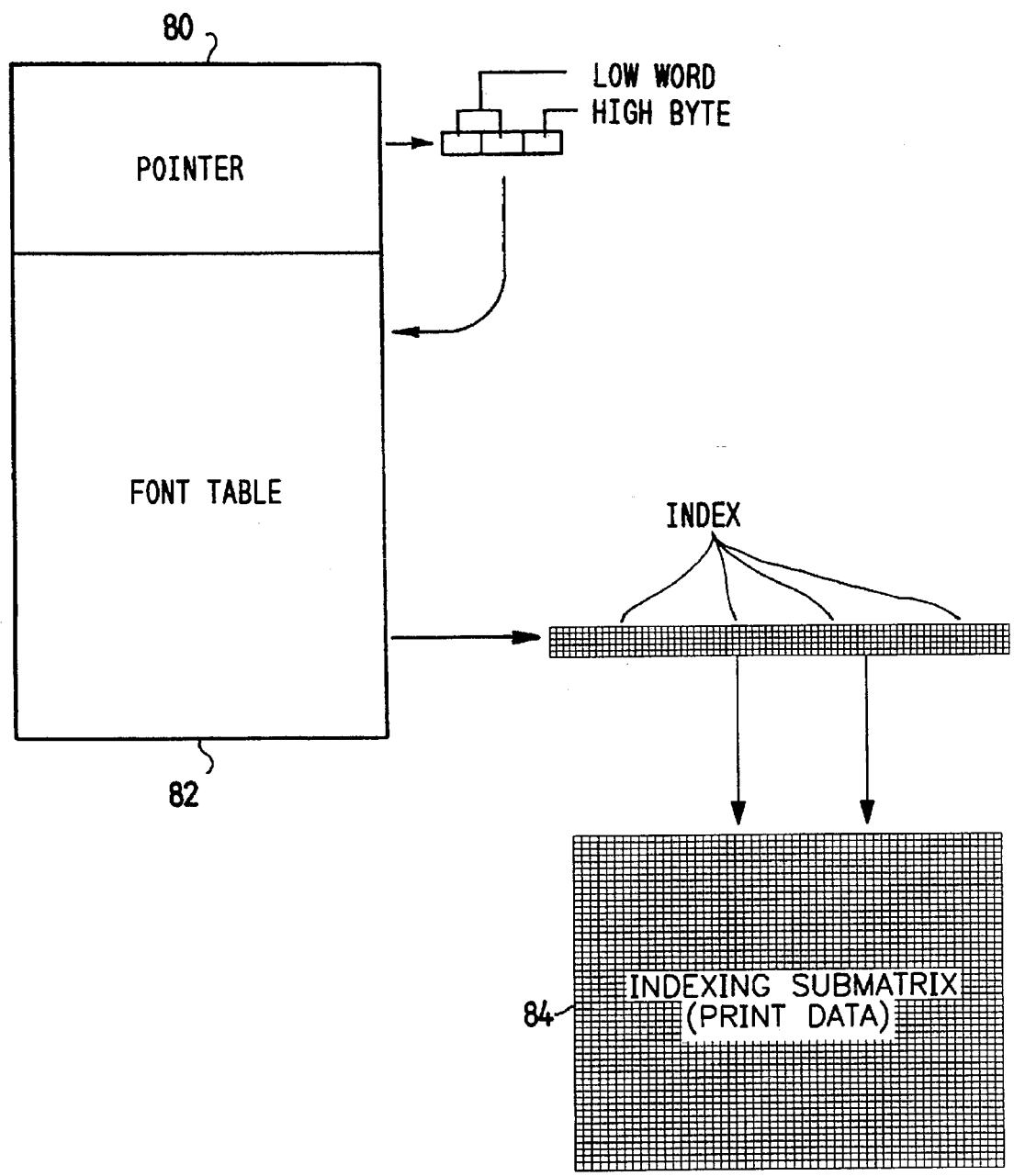
FIG. 33 is a structural diagram showing a CGROM according to a fourteenth embodiment.

FIG. 33 shows a structure of a CGROM 6 according to a fourteenth embodiment to which the present invention is applied. This embodiment is an example of a case where the fonts are compressed.

For convenience in description, description is made regarding to a dictionary type compression method in which the font pattern is divided into M1 rows by N1 columns submatrices to look up the indexes. However, the present invention can be applied to any other compression methods.

In the above mentioned compression of the dictionary type, a set of characters where one character is formed of bit patterns of M rows by N columns is divided for each character into a submatrix of M1 rows by N1 columns and performing indexing (assigning a same number to submatrices having the same dot patterns) on all of the submatrices to represent the character divided into said M1 rows by N1 columns by an index number associated with each submatrix, thereby M1 by N1 bits of the submatrix is compressed into bit numbers (generally a multiple of 8) used in the index number.

The CGROM 6 in this embodiment comprises a pointer 80, a font table 82 and an indexing submatrix 84 in which bit patterns are aligned that are looked up according to the index numbers in the font table 82. Other structures are similar to those described in the second embodiment.

This embodiment is similar to the thirteenth embodiment except that the processing at the S203 in the thirteenth embodiment is developed while looking up the index by using a conventional art. Accordingly, detailed description will be omitted.

Figure 34:
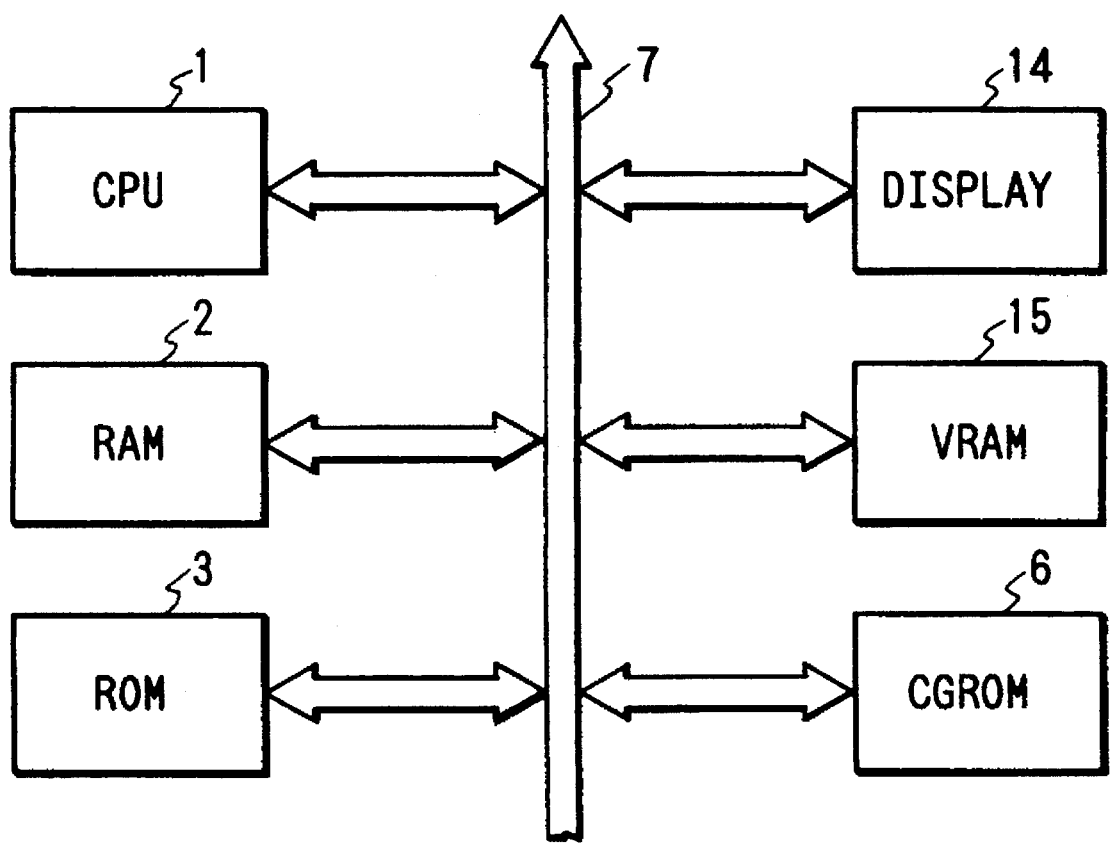
FIG. 34 is a block structural diagram applying the above mentioned first through fourteenth embodiments.

In the above mentioned first through fourteenth embodiments, preferred embodiments of the present invention have thus been described in conjunction with the printer (see FIG. 1) in the block diagram. However, an equivalent effect can be achieved by using a dot refresh type display device 14 as shown in FIG. 34 rather than using the printer 4. If the display device 14 is used, a destination where the fonts are produced is changed from the print buffer 5 (see FIG. 1) to a VRAM 15. However, processing itself is similar to those described in the first through thirteenth embodiments. Accordingly, detailed description thereof is omitted.

What is claimed is:

1. A character generating apparatus which combines unit patterns divided into predetermined units to generate character pattern data, said apparatus comprising:

first memory means for storing, for each character and for each character unit pattern, first data indicating that the unit pattern comprises a blank pattern, second data indicating that the unit pattern comprises a specific pattern which appears a plurality of times, or third data indicating that the unit pattern comprises a pattern other than the specific pattern, together with index data corresponding to the second data and pattern data corresponding to the third data;

second memory means for storing pattern data corresponding to the index data;

writing means for performing data writing upon reading data for a unit pattern to be generated from said first memory means, wherein (1) if the first data is read, said writing means writes blank pattern data, (2) if the second data is read, said writing means writes the pattern data stored in said second memory means corresponding to the second data, or (3) if the third data is read, said writing means writes the pattern data corresponding to the third data; and generating means for generating character pattern data by obtaining exclusive OR of the data written by said writing means for two adjacent unit patterns.

2. An apparatus according to claim 1, further comprising output means for outputting the character pattern data generated by said generating means.

3. An apparatus according to claim 2, wherein said output means comprises a printer.

4. An apparatus according to claim 2, wherein said output means comprises a display device.

5. An apparatus according to claim 1, wherein the specific pattern and the pattern other than the specific pattern are formed by obtaining exclusive OR of two adjacent unit pattern of an original character pattern.

6. An apparatus according to claim 1, wherein the specific pattern appears at least twice in all characters.

7. An apparatus according to claim 1, wherein the index data has a length variable depending on the number of appearances of the specific pattern.

8. A character generating method which combines unit pattern divided into predetermined units to generate character pattern data, using a first memory for storing, for each character and for each unit pattern, first data indicating that the unit pattern comprises a blank pattern, second data indicating that the unit pattern comprises a specific pattern which appears a plurality of times, or third data indicating that the unit pattern comprises a pattern other than the specific pattern, together with index data corresponding to the second data and pattern data corresponding to the third data and a second memory for storing pattern data corresponding to the index data, said method comprising the steps of:

performing data writing upon reading data for a unit pattern to be generated from the first memory, wherein (1) if the first data is read, said performing step writes blank pattern data, (2) if the second data is read, said performing step writes the pattern data stored in the second memory corresponding to the second data, or (3) if the third data is read, said performing step writes the pattern data corresponding to the third data; and generating character pattern data by obtaining exclusive OR of the data written in said performing step for two adjacent unit patterns.

9. A method according to claim 8, further comprising the step of outputting the generated character pattern data.

10. A method according to claim 9, wherein said outputting step outputs the generated character pattern data using a printer.

11. A method according to claim 9, wherein said outputting step outputs the generated character pattern data using a display device.

12. A method according to claim 8, wherein the specific pattern appears at least twice in all characters.

13. A method according to claim 8, wherein the specific pattern and the pattern other than the specific pattern are formed by obtaining exclusive OR of two adjacent unit pattern of an original character pattern.

14. A method according to claim 8, wherein the index has a length variable depending on the number of appearances of the specific pattern.

15. A storage medium which stores a program to be carried out in a character generating apparatus which combines unit patterns divided into predetermined units to generate character pattern data, the apparatus having a first memory for storing, for each character and for each unit pattern, first data indicating that the unit pattern comprises a blank pattern, second data indicating that the unit pattern comprises a specific pattern which appears a plurality of times, or third data indicating that the unit pattern comprises a pattern other than the specific pattern, together with index data corresponding to the second data and pattern data corresponding to the third data and a second memory for storing pattern data corresponding to the index data, with the program comprising the steps of:

performing data writing upon reading data for a unit pattern to be generated from the first memory, wherein (1) if the first data is read, said performing step writes blank pattern data, (2) if the second data is read, said performing step writes the pattern data stored in the second memory corresponding to the second data, or (3) if the third data is read, said performing step writes the pattern data corresponding to the third data; and generating character pattern data by obtaining exclusive OR of the data written in said performing step for two adjacent unit patterns.

16. A storage medium according to claim 15, wherein the program further comprises the step of outputting the generated character pattern data.

17. A storage medium according to claim 16, wherein said outputting step outputs the generated character pattern data with a printer.

18. A storage medium according to claim 16, wherein said outputting step outputs the generated character pattern data with a display device.

19. A storage medium according to claim 15, wherein the specific pattern appears at least twice in all characters.

20. A storage medium according to claim 15, wherein the specific pattern and the pattern other than the specific pattern are formed by obtaining exclusive OR of two adjacent unit patterns of an original character pattern.

21. A storage medium according to claim 15, wherein the index data has a length variable depending on the number of appearances of the specific pattern.

* * * * *

UNITED STATES PATENT AND TRADEMARK OFFICE
CERTIFICATE OF CORRECTION

PATENT NO. : 5,644,684

DATED : July 1, 1997

INVENTOR(S): MASAKI NISHIYAMA

Page 1 of 4

It is certified that error appears in the above-identified patent and that said Letters Patent is hereby corrected as shown below:

On the title page, item:
[56] REFERENCES CITED

U.S. Patent Documents
        Insert: --5,453,938 9/1995 Gohara et al. ....... 364/514R--.

COLUMN 1

Line 25, "a" should be deleted.

COLUMN 2

Line 66, "portions" should read --portion--.

COLUMN 4

Line 40, "(.three" should read --(three--.
    Line 56, "which" should read --those to which--.

COLUMN 5

Line 24, step S104," should read --step S107,--.
    Line 32, "step S111" should read --step S110--.
    Line 34, "byte" should read --bytes--.
    Line 57, "step S111" should read --step S110--.

UNITED STATES PATENT AND TRADEMARK OFFICE
CERTIFICATE OF CORRECTION

PATENT NO. : 5,644,684

DATED : July 1, 1997

INVENTOR(S) : MASAKI NISHIYAMA

It is certified that error appears in the above-identified patent and that said Letters Patent is hereby corrected as shown below:

COLUMN 6

Line 35, "byte" should read --bytes--.

COLUMN 8

Line 10, "which" should read --those to which--.

COLUMN 10

Line 28, "which" should read --those to which--.
    Line 38, "calculates is" should read --calculated
      is a--.
    Line 46, "INOX6+indexing" should read --INOx6+indexing--.

COLUMN 11

Line 1, "lates" should read --lated--.
    Line 56, "unnecessary" should read --unnecessary.--.
    Line 57, "obtained" should read --This number is
      obtained--.

COLUMN 12

Line 8, "comprises" should be deleted.
    Line 67, "bites" should read --bytes--.

UNITED STATES PATENT AND TRADEMARK OFFICE
CERTIFICATE OF CORRECTION

PATENT NO. : 5,644,684

DATED : July 1, 1997

INVENTOR(S): MASAKI NISHIYAMA

It is certified that error appears in the above-identified patent and that said Letters Patent is hereby corrected as shown below:

COLUMN 13

Line 18, "step S214" should read --step S514--.
    Line 52, "all black" should read --all-black--.
    Line 60, "all black" should read --all-black--.

COLUMN 14

Line 51, "which" should read --those to which--.

COLUMN 16

Line 67, "S203" should read --S803--.

COLUMN 17

Line 53, "pattern" (first occurrence) should read --patterns--.

UNITED STATES PATENT AND TRADEMARK OFFICE
CERTIFICATE OF CORRECTION

PATENT NO. : 5,644,684

DATED : July 1, 1997

INVENTOR(S) : MASAKI NISHIYAMA

It is certified that error appears in the above-identified patent and that said Letters Patent is hereby corrected as shown below:

<u>COLUMN 18</u>

Line 31, "pattern" (first occurrence) should read --patterns--.

Signed and Sealed this

Twenty-fourth Day of March, 1998

*Attest:*

BRUCE LEHMAN

*Attesting Officer*     *Commissioner of Patents and Trademarks*